United States Patent
Laluet et al.

(10) Patent No.: US 10,688,757 B2
(45) Date of Patent: Jun. 23, 2020

(54) LAMINATED VEHICLE WINDSHIELD WITH INTERNAL LUMINOUS SIGN(S)

(71) Applicant: SAINT-GOBAIN GLASS FRANCE, Courbevoie (FR)

(72) Inventors: Jean-Yves Laluet, Paris (FR); Pascal Bauerle, Roye (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 183 days.

(21) Appl. No.: 16/062,361

(22) PCT Filed: Dec. 13, 2016

(86) PCT No.: PCT/FR2016/053364
§ 371 (c)(1),
(2) Date: Jun. 14, 2018

(87) PCT Pub. No.: WO2017/103425
PCT Pub. Date: Jun. 22, 2017

(65) Prior Publication Data
US 2018/0370195 A1  Dec. 27, 2018

(30) Foreign Application Priority Data

Dec. 14, 2015 (FR) .................................. 15 62333

(51) Int. Cl.
*B60Q 1/26* (2006.01)
*B32B 17/10* (2006.01)
*G02B 27/01* (2006.01)

(52) U.S. Cl.
CPC .. *B32B 17/10045* (2013.01); *B32B 17/10541* (2013.01); *B32B 17/10669* (2013.01); *B32B 17/10697* (2013.01); *G02B 27/01* (2013.01); *G02B 27/0101* (2013.01); *B32B 2605/006* (2013.01); *G02B 2027/0112* (2013.01); *G02B 2027/0194* (2013.01)

(58) Field of Classification Search
CPC ........ B32B 17/10036; B32B 17/10045; B32B 17/10348; B32B 17/10541; B32B 17/10669; B32B 17/10697; B32B 17/10761; B60J 1/02; B60K 35/00; G02B 27/01
USPC .................................................. 362/503–504
See application file for complete search history.

(56) References Cited

U.S. PATENT DOCUMENTS

2014/0097636 A1   4/2014  Snider et al.

FOREIGN PATENT DOCUMENTS

| CN | 202503691 U | 10/2012 |
|---|---|---|
| FR | 2 519 501 A1 | 7/1983 |
| WO | WO 04/025334 A2 | 3/2004 |

(Continued)

OTHER PUBLICATIONS

International Search Report as issued in International Patent Application No. PCT/FR2016/053364, dated Mar. 15, 2017.

*Primary Examiner* — Jason M Han
(74) *Attorney, Agent, or Firm* — Pillsbury Winthrop Shaw Pittman LLP

(57) ABSTRACT

A laminated vehicle windshield containing internal luminous information, includes a first glazing, a lamination interlayer, a second glazing and peripheral exterior and interior masking layers. The interior masking layer is discontinuous and includes one or more first discontinuities that form a first sign. The windshield also includes a first curved organic-light-emitting-diode device to illuminate the first sign.

20 Claims, 16 Drawing Sheets

(56) References Cited

FOREIGN PATENT DOCUMENTS

| | | |
|---|---|---|
| WO | WO 2013/093351 A1 | 6/2013 |
| WO | WO 2015/041106 A1 | 3/2015 |

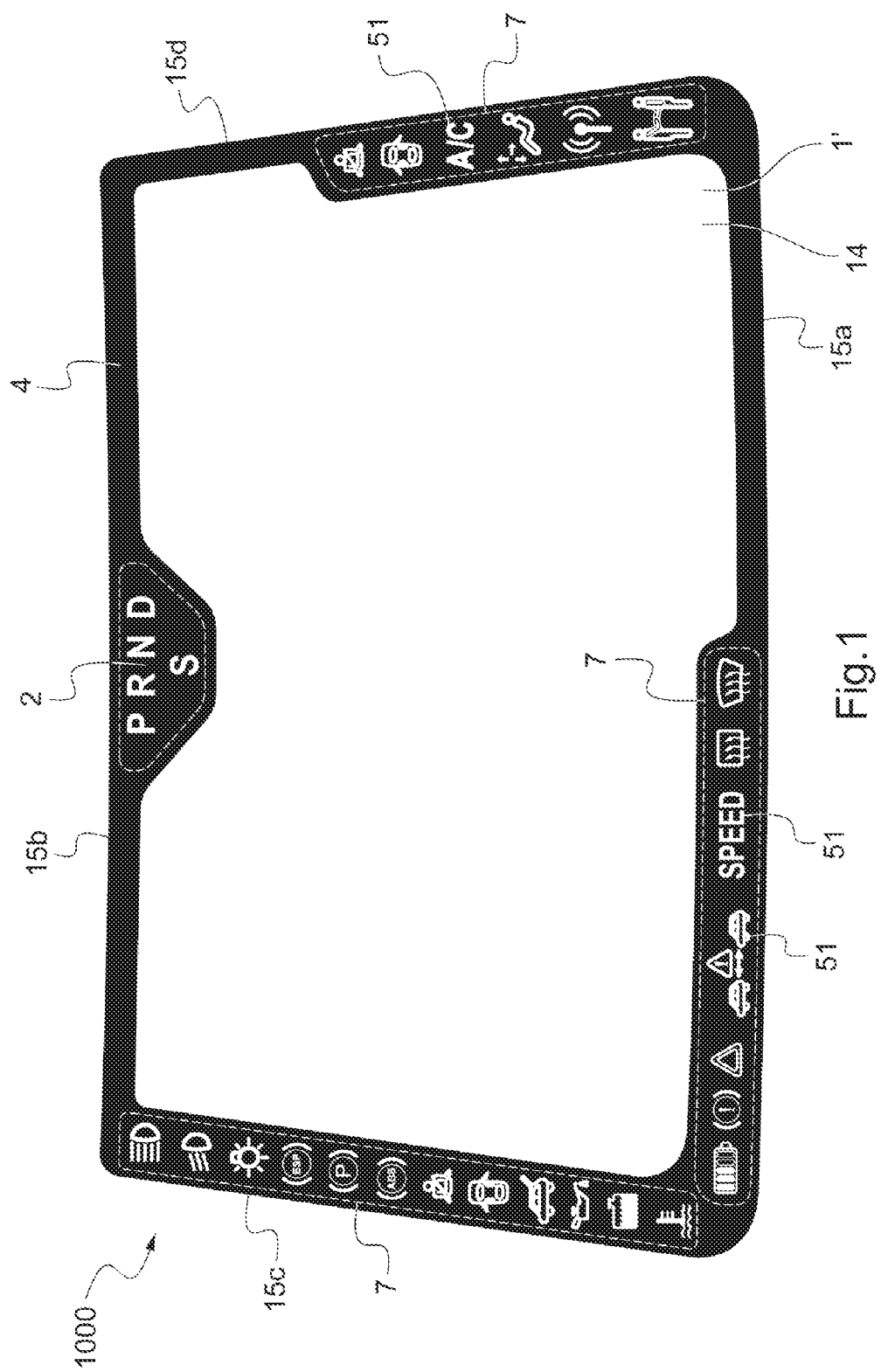

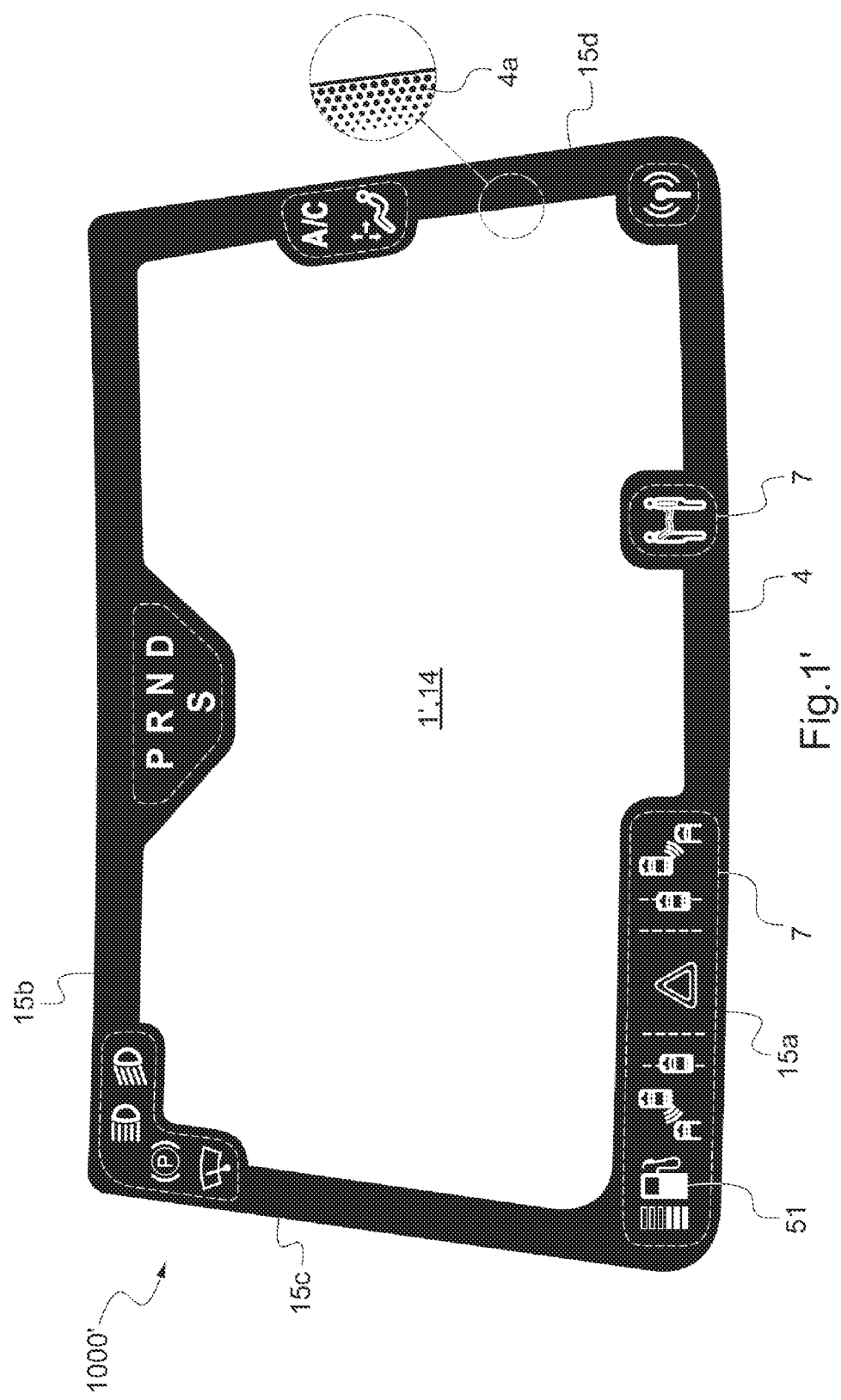

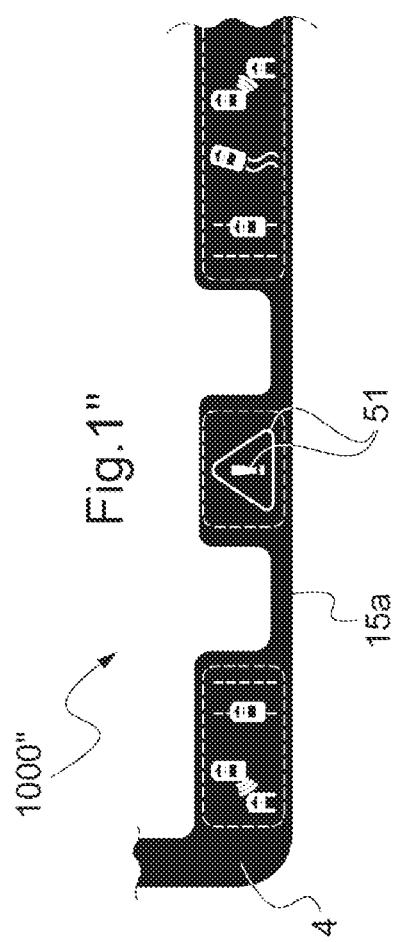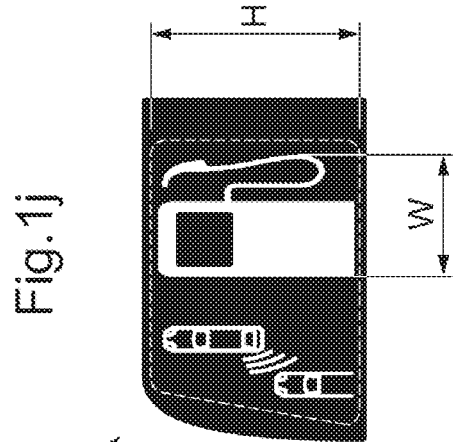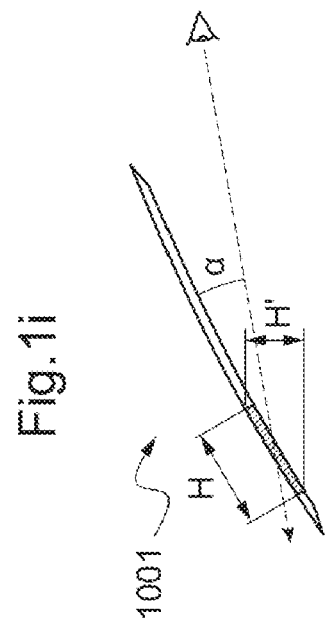

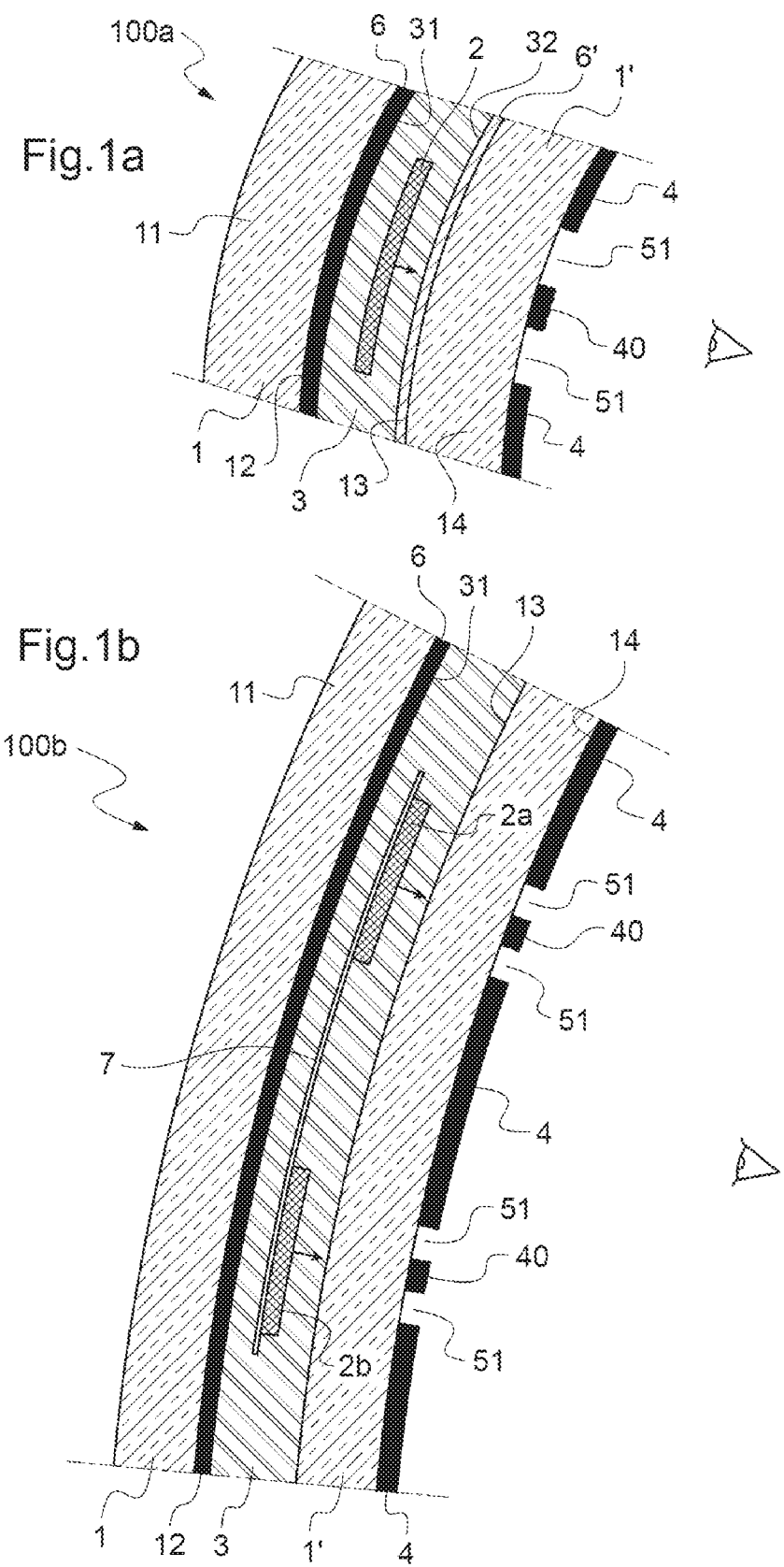

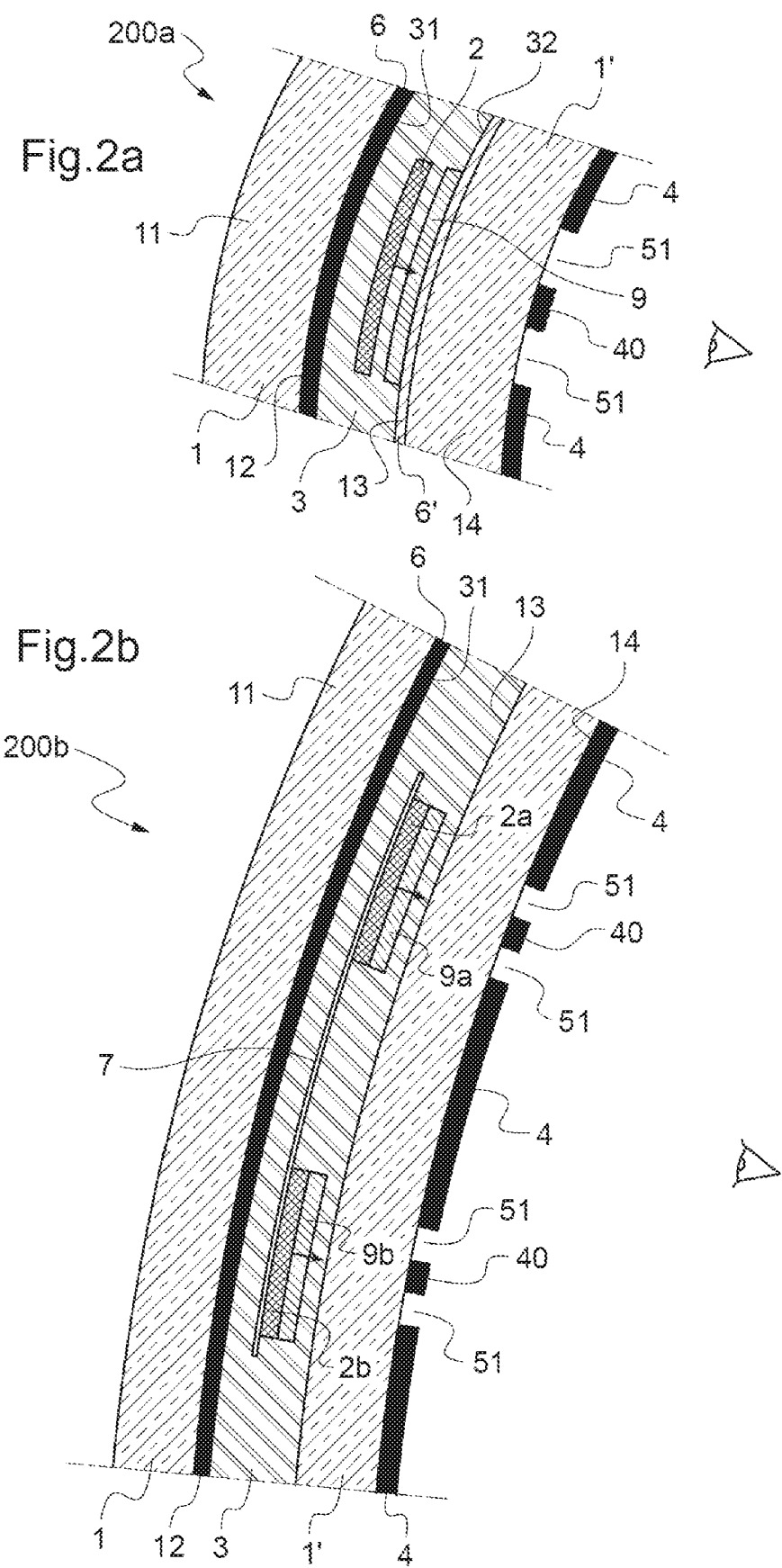

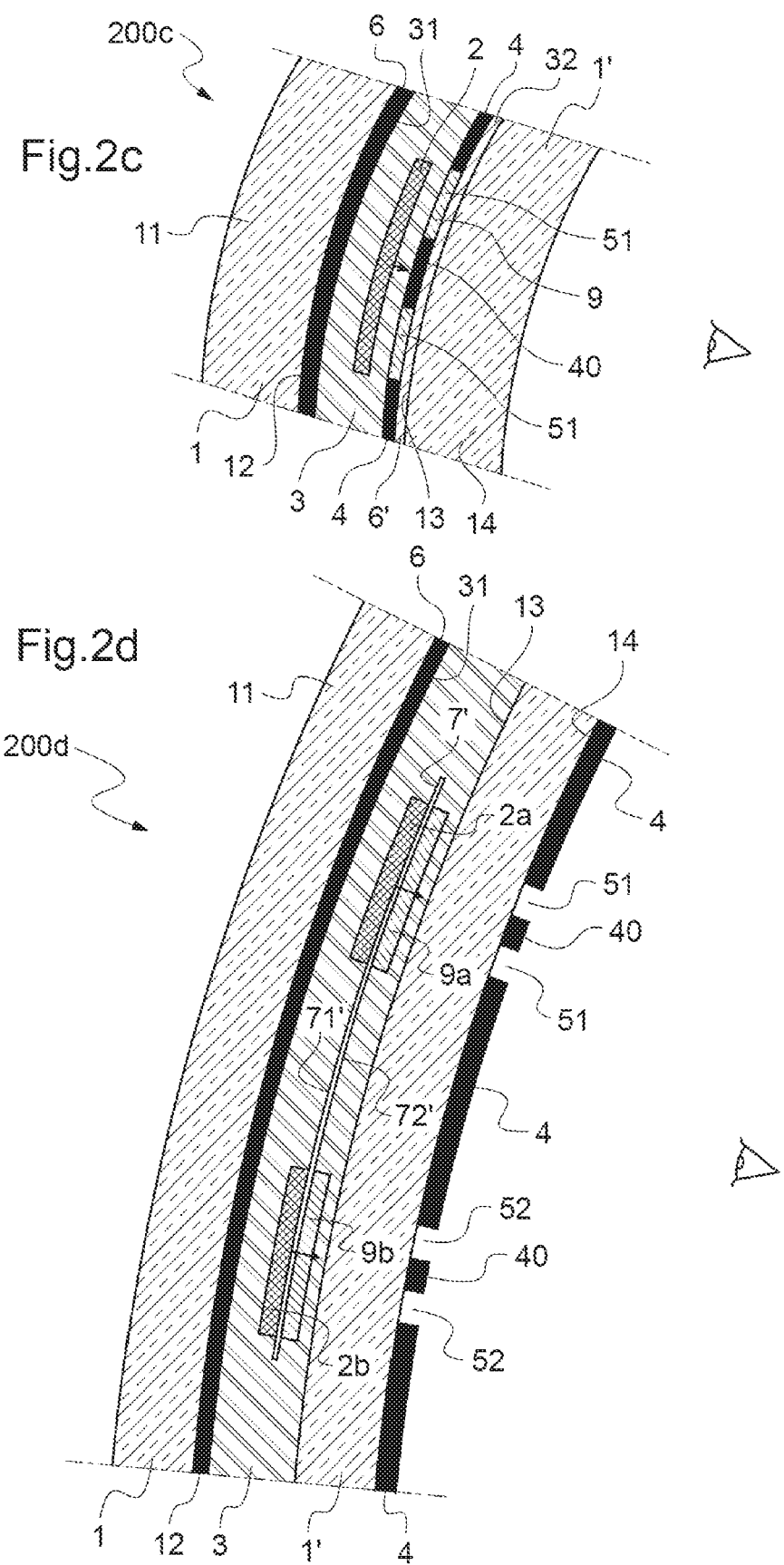

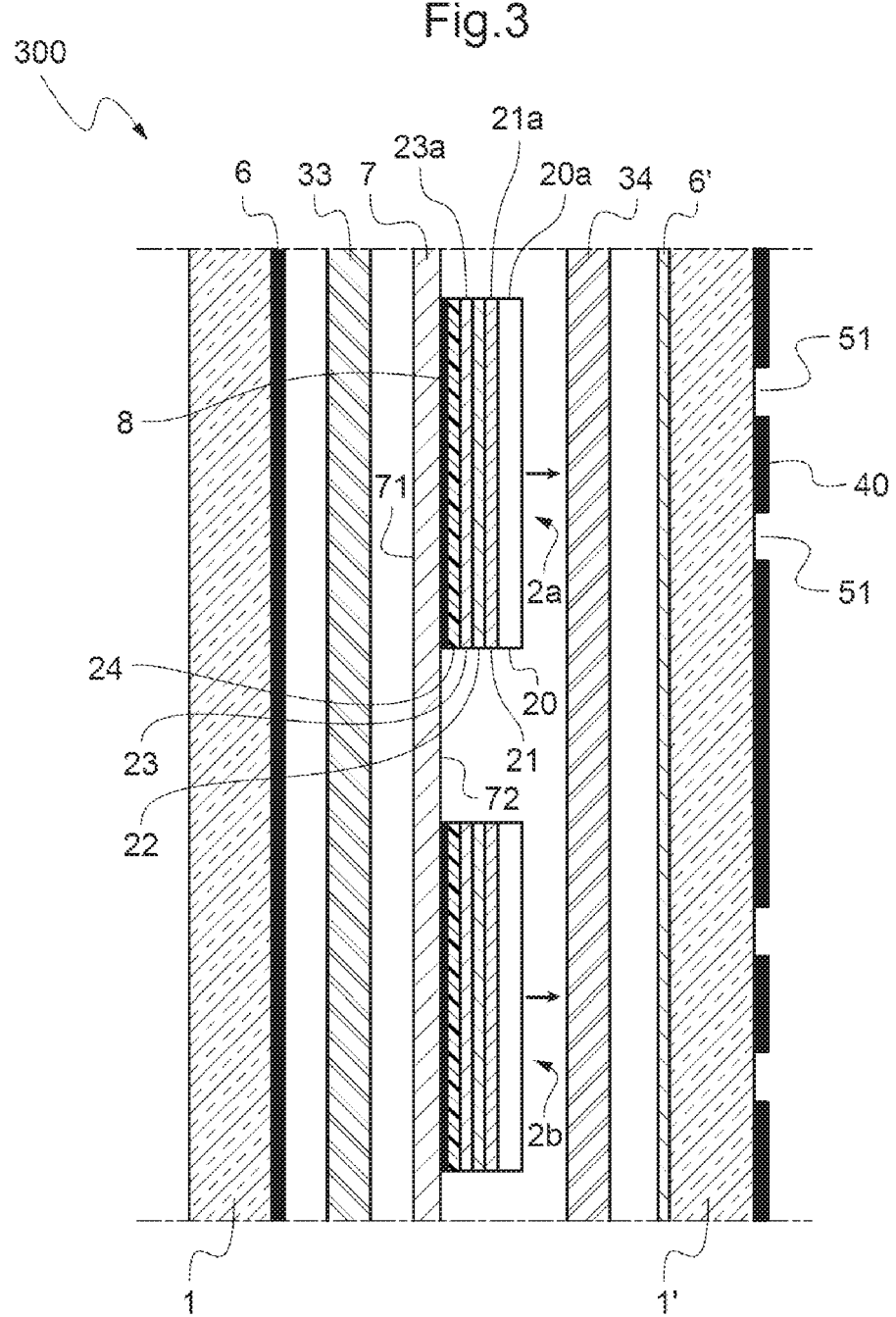

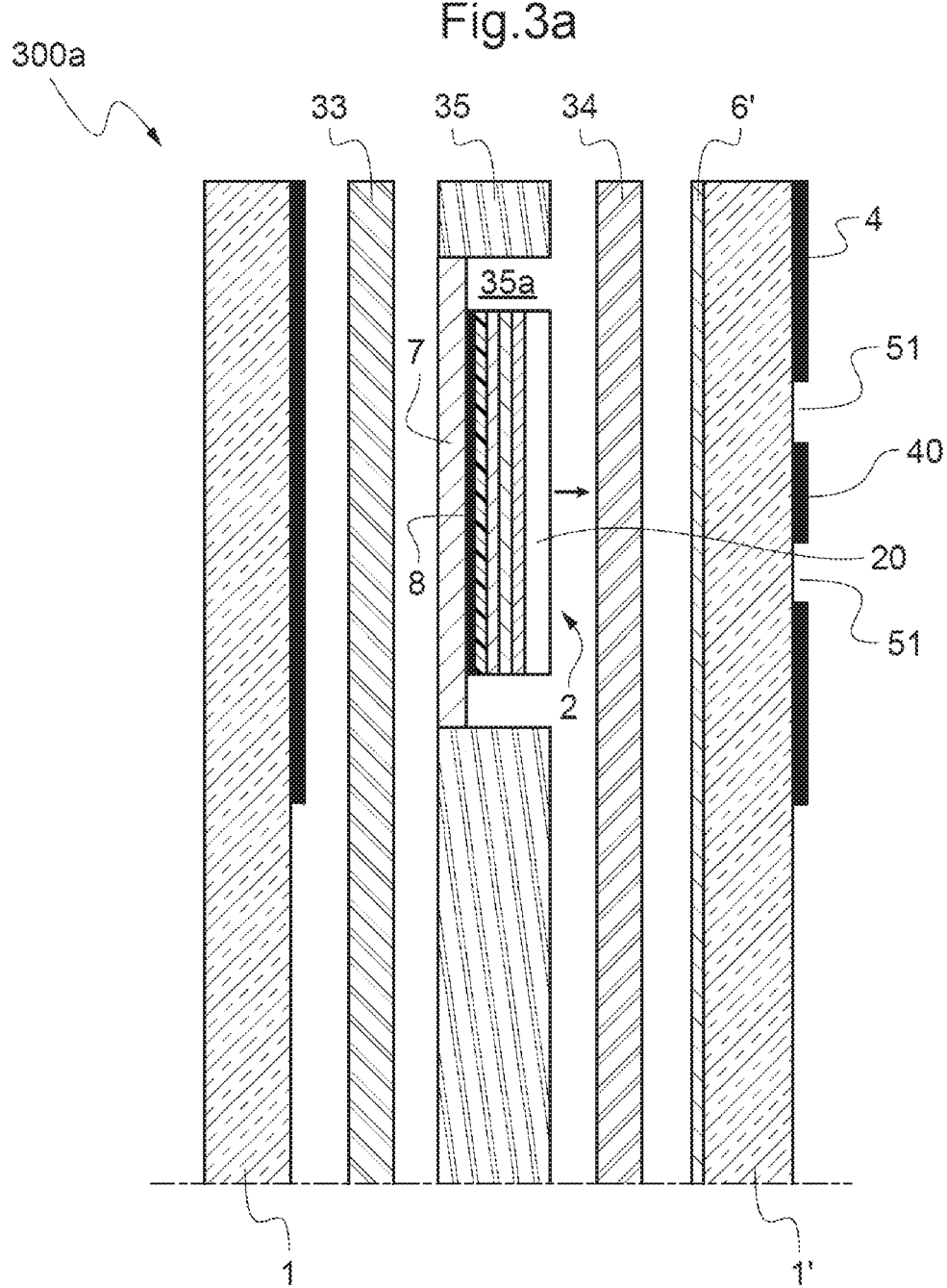

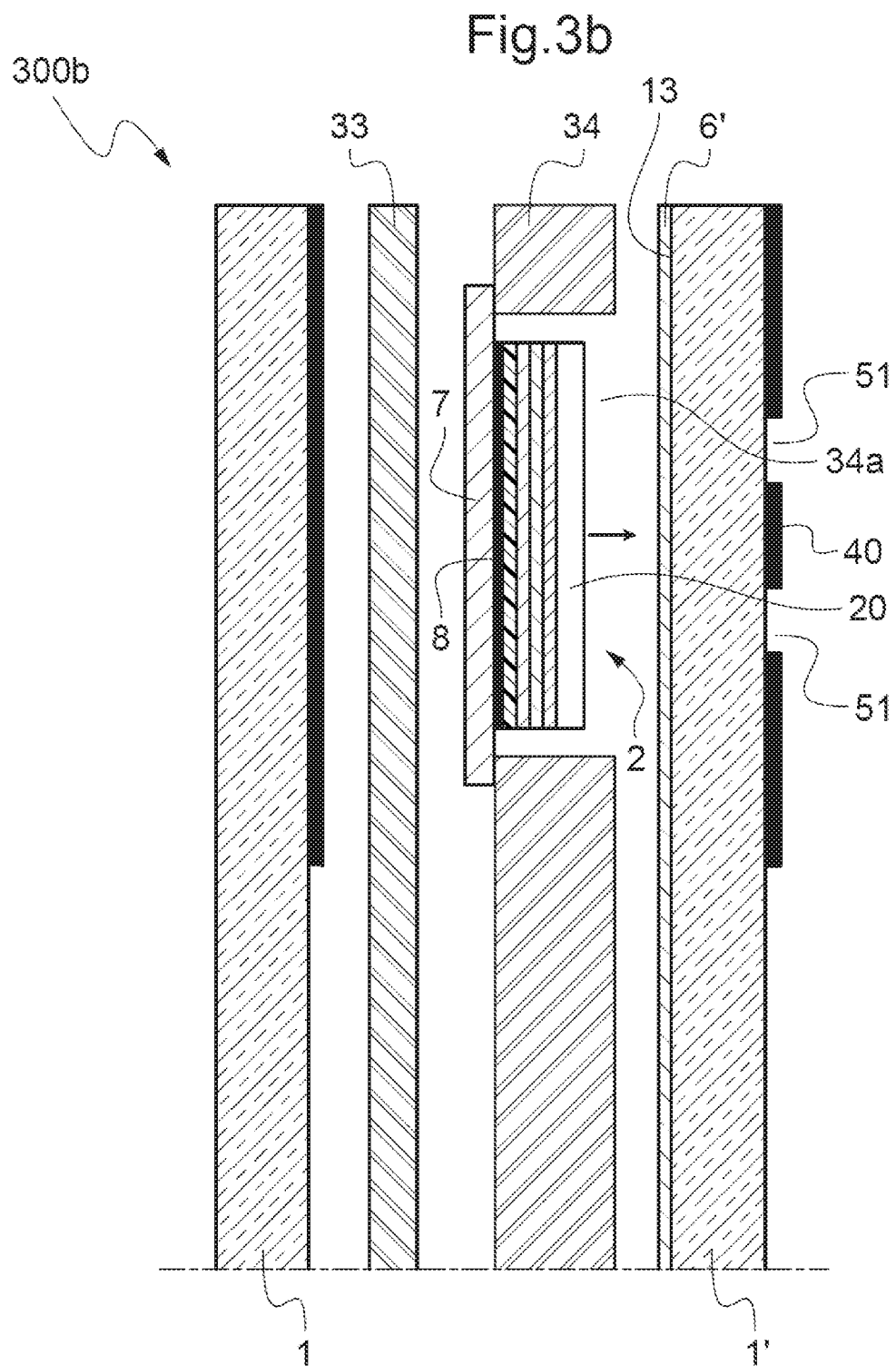

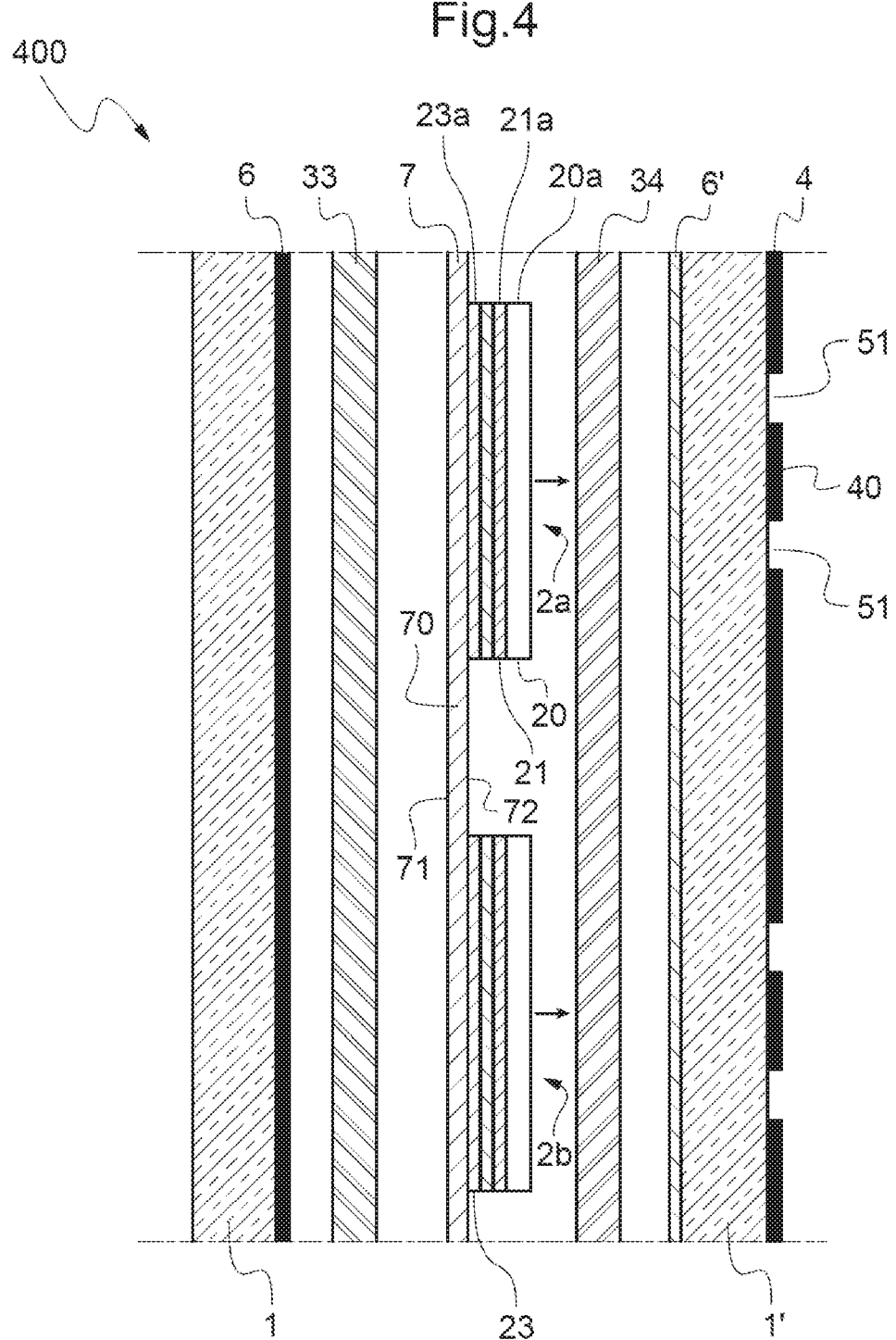

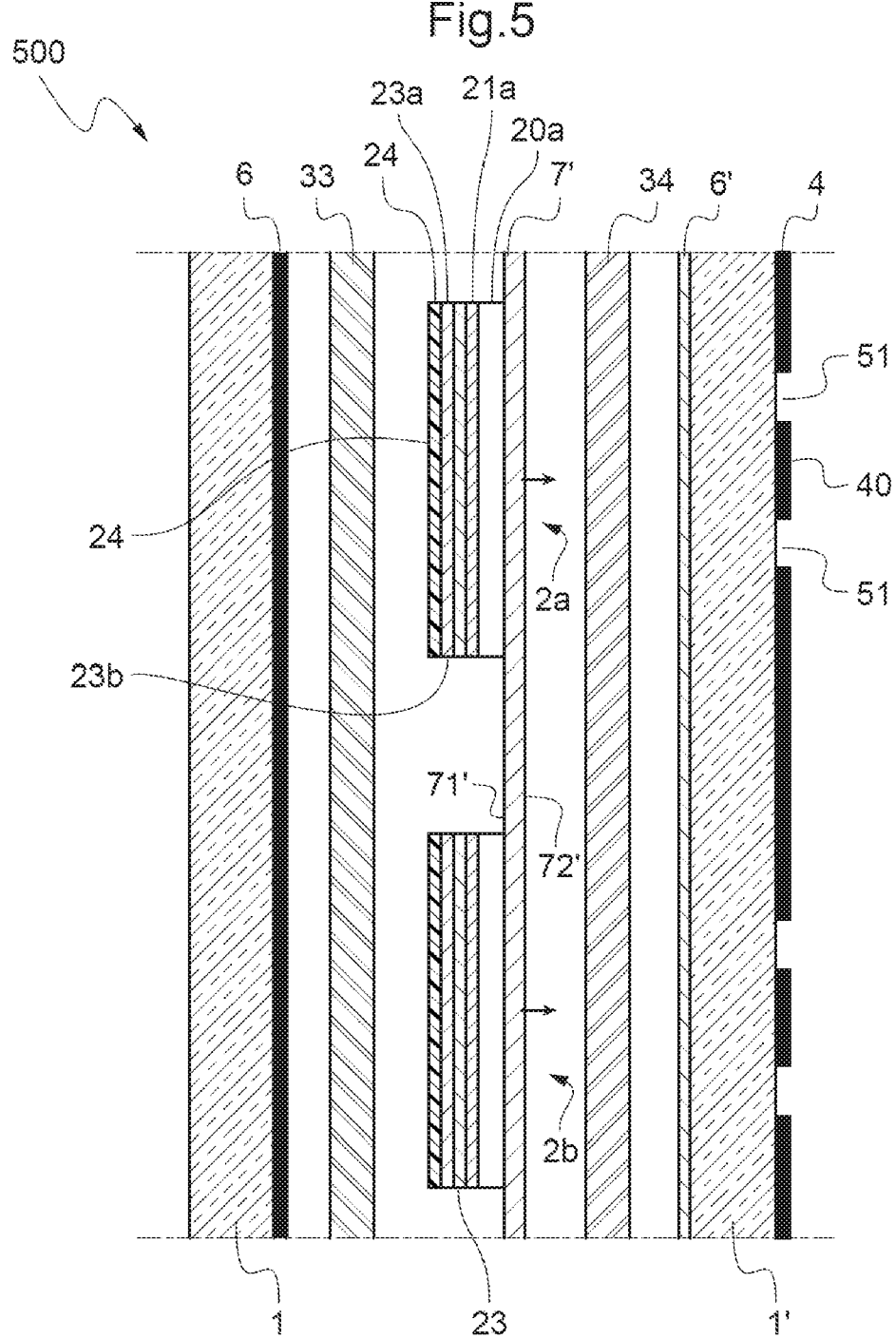

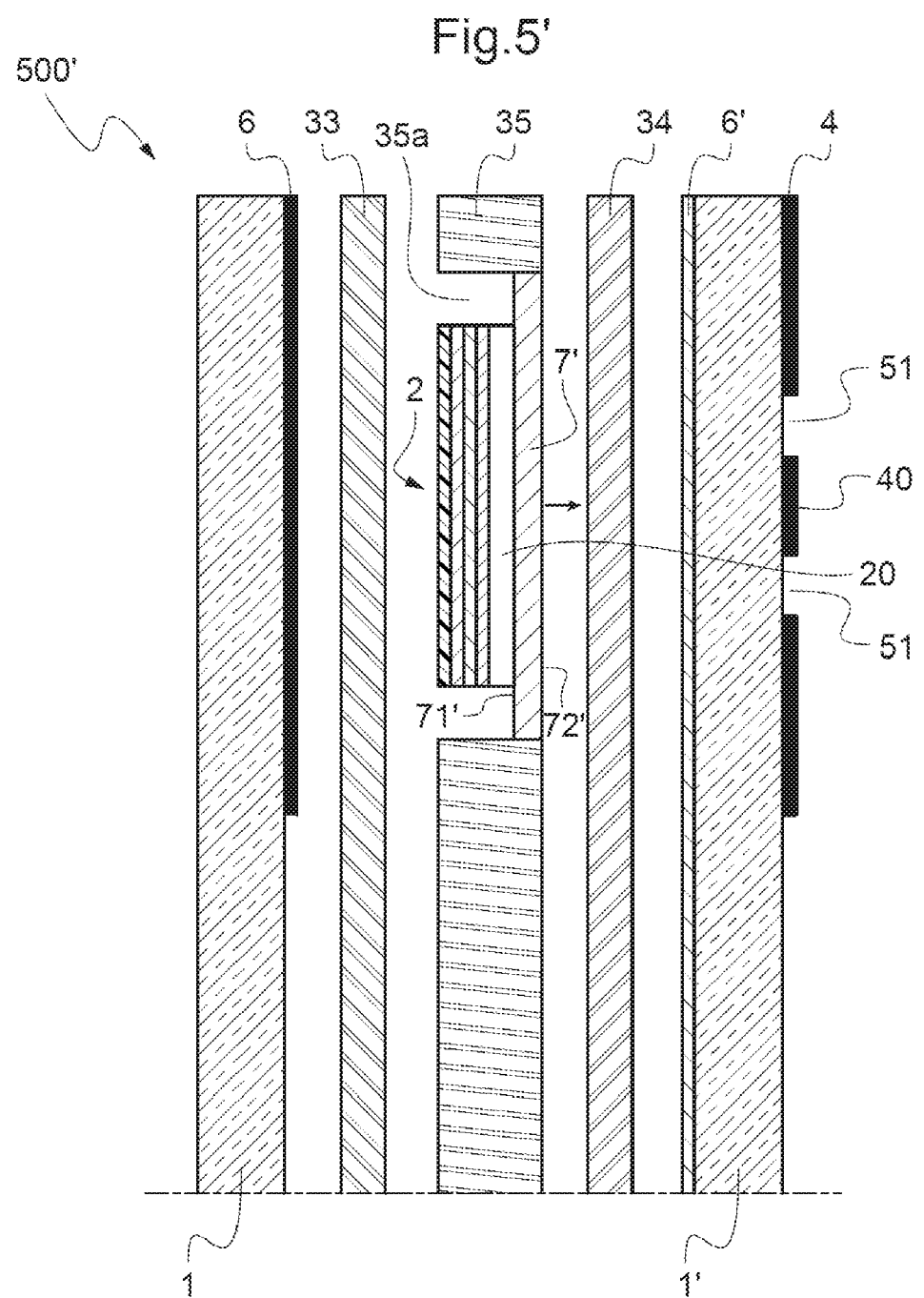

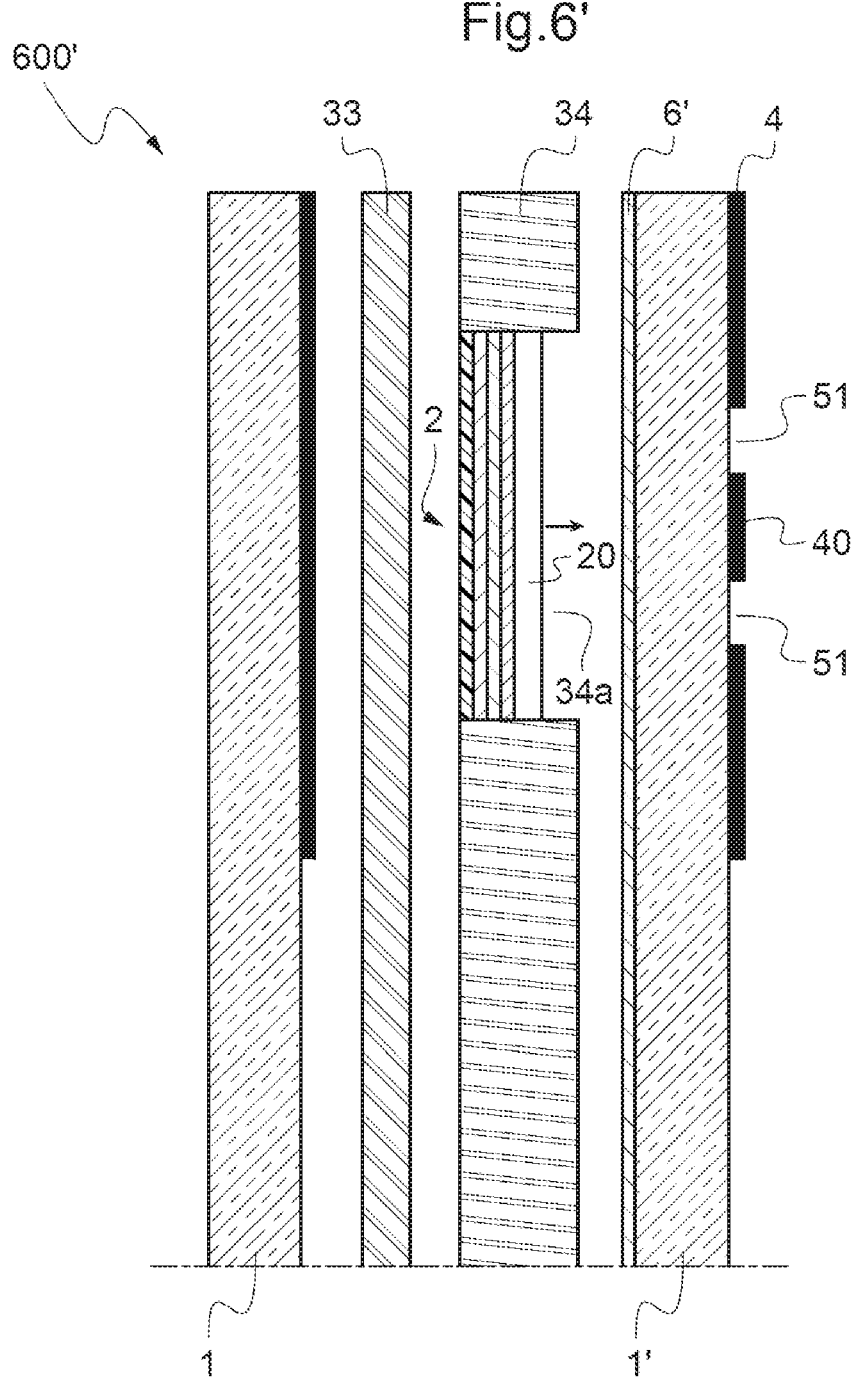

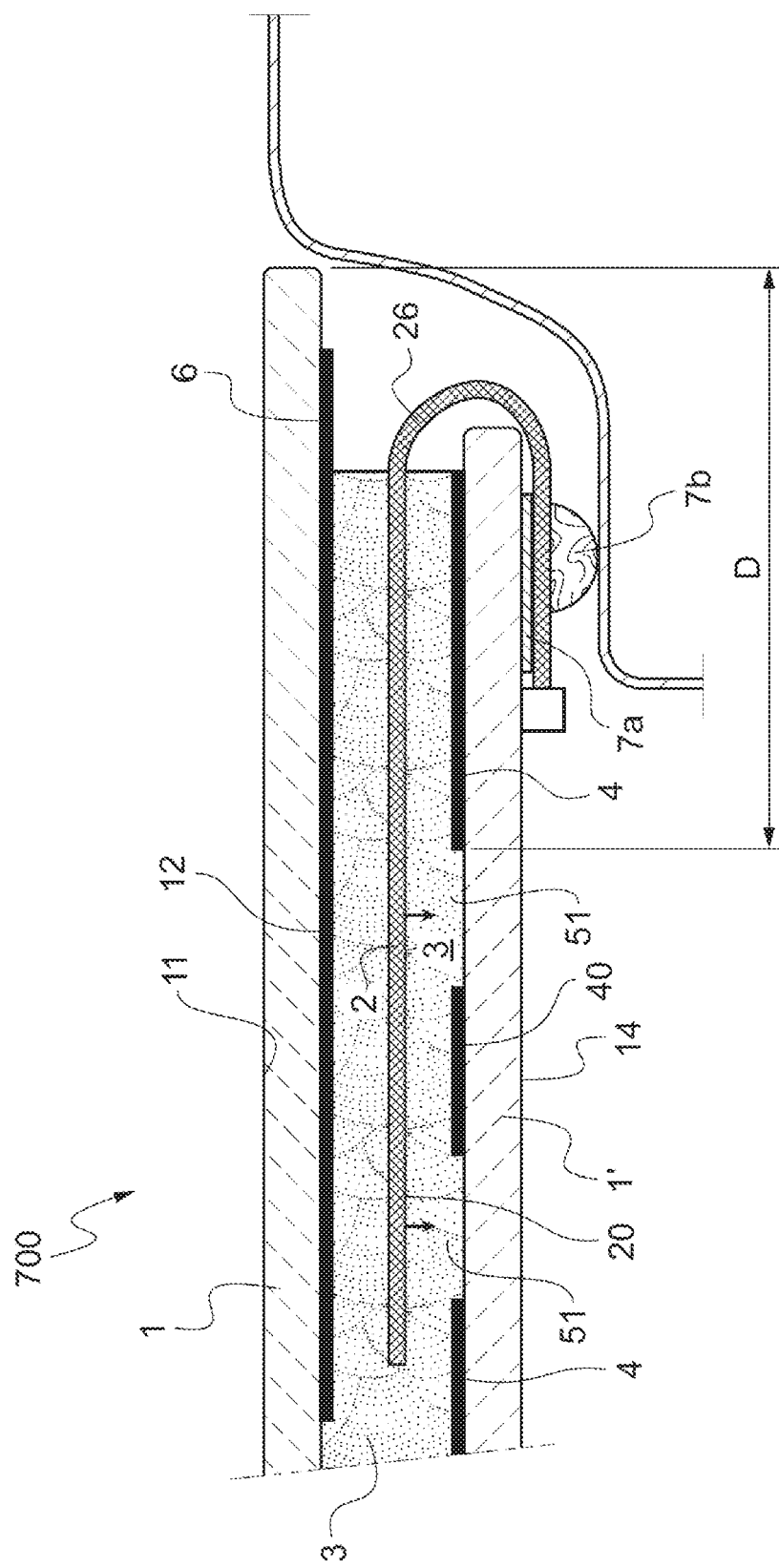

LAMINATED VEHICLE WINDSHIELD WITH INTERNAL LUMINOUS SIGN(S)

CROSS-REFERENCE TO RELATED APPLICATIONS

This application is the U.S. National Stage of PCT/FR2016/053364, filed Dec. 13, 2016, which in turn claims priority to French pat ent application number 1562333 filed Dec. 14, 2015. The content of these applications are incorporated herein by reference in their entireties.

The invention relates to the field of laminated vehicle windshields including a luminous sign and in particular luminous pictograms.

Windshields are increasingly equipped with systems for displaying visual information intended to assist with driving.

Patent application WO2013/093351 thus proposes a laminated windshield providing luminous information, including:
- a peripheral first masking layer for the exterior, which is opaque, made of a black enamel and placed in contact with the internal face of the first glazing, which is outermost;
- a peripheral second masking layer for the interior, which is opaque, made of a black enamel and placed in contact with the internal face of the second glazing, which is innermost, this masking layer comprising apertures forming pictograms;
- a uniform layer of a material doped with luminescent species chosen for their ability to absorb light radiation produced by a source generating radiation in the UV domain, such as an array of light-emitting diodes, and to reemit light radiation in the visible domain, said uniform luminescent layer being placed in the glazing, between the interior and exterior masking layers.

Admittedly, the proposed solution allows the information to be displayed in an edge zone of the windshield, where the contrast remains high enough for the information to be visible only from the interior without the need for coherent exciting light sources of high power or that are complex because they are equipped with systems for controlling the direction of the beam.

However, the use of a UV source is a risk from the point of view of eye safety and makes the device complicated. Lastly, the luminescent particles are sensitive to heat and to bleaching. Thus, at the present time this technology is still not mature.

The aim of the present invention is to provide at a controlled cost a laminated vehicle windshield containing internal luminous information and allowing all of the aforementioned problems to be addressed.

More precisely, the present invention relates to a laminated vehicle windshield including one or more internal luminous signs, comprising:
- a first curved glazing that is preferably made of mineral glass and optionally tinted, in particular grey or green, with a first main face called F1 that is intended to be exterior side of the vehicle and an opposite second main face called F2, said glazing being of thickness E1 of preferably at most 2.5 mm, and even of at most 2 mm—in particular 1.9 mm, 1.8 mm, 1.6 mm and 1.4 mm—or even of at most 1.3 mm or of at most 1 mm;
- a second curved (just like the first glazing) glazing that is preferably made of mineral glass, with a third main face called F3 and an opposite fourth main face called F4 that is in particular intended to be interior side of the vehicle, of thickness E1 preferably being smaller than E1, and even of at most 2.2 mm, or of at most 2 mm—in particular 1.9 mm, 1.8 mm, 1.6 mm and 1.4 mm—or even of at most 1.3 mm or of at most 1 mm, the total thickness of the glazings E1+E'1 preferably being strictly smaller than 4 mm and even than 3.7 mm, at least one—and better still both—of the first and second glazings being made of mineral glass, the other optionally being made of organic glass i.e. of a material such as polycarbonate,
- said first and second glazings being connected together via the faces F2 and F3 by a lamination interlayer made of (clear or extra-clear) thermoformable and preferably thermoplastic polymeric material located face F2 side and of (total) thickness E3 of at most 2.2 mm and better still of at most 2 mm, of at most 1.5 mm or even of at most 1 mm, said interlayer, for example, being made up of 1, 2 or 3 sheets and in particular being set back from the edge face of the second glazing (by at most 5 mm or even at most 2 mm or at most 1 mm) and even set back from the edge face of the first glazing (by at most 5 mm or even at most 2 mm or at most 1 mm), said interlayer including a first bonding main face, face F2 side and a second bonding main face, face F3 side;
- a first peripheral layer called the interior masking layer made of opaque material, which is between the second bonding face and the face F3 and in particular along a border of the face F3—in particular (directly) on face F3 or even (directly) on the second bonding face—or which is on face F4 and in particular along a border of the face F4—in particular being (directly) on face F4 or even (directly) on the second bonding face, said interior masking layer being discontinuous and thus comprising one or more first discontinuities, preferably distant discontinuity or discontinuities of the outline of the interior masking layer (therefore surrounded by one or more unapertured zones of the interior masking later), the one or more first discontinuities form a first sign, made up of one or more symbols and/or letters;
- a second peripheral layer called the exterior masking layer made of opaque material, between the first bonding face and the face F2, facing the interior masking layer and the one or more first discontinuities—and which is therefore along a border of the face F2; and
- a first light source able to emit a first emission for the first sign.

Furthermore, the first light source is a first curved (because flexible and soft) organic-light-emitting-diode device called an OLED device of preferably subcentimeter-sized thickness E2 smaller than E3 and even of at most 0.5 mm and better still at most 0.35 mm and in particular of thickness substantially equal to the thickness of one thermoplastic sheet and therefore of 0.76 mm, 0.38 mm or 0.17 mm, which sheet may be apertured to house the OLED device on an optional carrier.

The first OLED device is able to emit a (monochromatic or polychromatic) first emission in the visible spectrum so as to illuminate (directly) the first sign (and may even be controllable to emit a distinct second emission).

The first OLED device preferably includes a first (preferably polymeric) curved (preferably transparent) substrate, preferably on the face F3 side, said substrate bearing in the following order: an optional (in particular mineral) single-layered or multilayered sublayer (in particular forming a barrier to moisture or to alkali metals and/or even a light-extracting layer etc.); a preferably transparent lower electrode (closest to the substrate);

a first organic light-emitting system; and a preferably reflective electrode called the upper electrode (the furthest from the substrate); and optionally an overlayer such as an encapsulating layer (deposit or film that is for example polymeric, for example adhesively bonded, etc.).

The first OLED device is between the faces F2 and F3, is able to illuminate the first sign (by backlighting), thus facing the first sign, and facing the interior masking layer, and preferably able to emit light only toward the first sign.

Using an OLED device rather than a UV source is safer. Furthermore, its presence between the glazings rather than outside of and away from the windshield ensures a better integration and facilitates installation. OLED technology, which is reliable, allows a good backlighting performance (brightness, color rendering, stability) to be obtained without glare and is of small thickness, making lamination possible.

The flexibility of the flexible OLED allows the curvature of the glazings to be closely followed.

In the present application, the term "sign" should be understood to mean an iconic and/or linguistic signifier, i.e. one using symbols (numbers, pictograms, logos, symbolic colors, etc.) and/or letters or words.

The invention is particularly suitable for a windshield of rectangular shape defined by its lateral and longitudinal edges and having an opaque peripheral border, such as one made of enamel, on face F2 and on face F3 or on F2 and F4.

The first sign and even a second sign or a plurality of signs, each backlit by a dedicated OLED device, may be located:
along the lower longitudinal edge (in mounted position), in particular driver side, above all when the signs are driver aids (pictograms, etc.) requiring a rapid reaction from the driver;
alternatively or cumulatively, along the upper longitudinal edge (in mounted position) in particular when the pictograms are driver aids or information on the state of the vehicle;
alternatively or cumulatively, along the driver side lateral edge (in mounted position) in particular when the pictograms are driver aids or information on the state of the vehicle;
alternatively or cumulatively, along the passenger side lateral edge (in mounted position) in particular for pictograms concerning the passenger.

The first sign may be chosen from:
a driver aid preferably on the lower longitudinal edge;
a status indicator indicating an operating state of the automobile, preferably on the lower longitudinal edge, upper longitudinal edge or driver side lateral edge;
information on the external environment: weather, etc. on the upper longitudinal edge; and
an indicator indicating connectivity to a communications network on the front passenger side lateral edge.

The first sign is preferably formed in a first unapertured zone of the interior masking layer (zone of uniform appearance preferably made of enamel and on face F2). The first sign may be in proximity to a discontinuous (decorative) interior-masking zone adjacent the first unapertured zone, in particular taking the form of a set of decorative patterns (that will often be subcentimeter-sized and spaced apart by 0.01 to 2 cm) in particular made of enamel (the same enamel as the unapertured zone). For example, the patterns are of decreasing size in the direction of the middle of the vision area and/or increasingly spaced in the direction of the middle of the vision area.

The interior masking layer may be a strip along one edge of the windshield. It may be desired to locally increase its width so that the driver (or copilot) is better able to see the first sign (without having to lower his gaze too much).

Furthermore, the interior masking layer may be an in particular longitudinal or lateral driver (or passenger) side strip (made of enamel, on face F3 or F4) of width L0 of at most 2, 5, 10, 20 cm or 30 cm, and in the zone of the first sign of width L1>L0.

The first OLED device may be able to emit, depending on control signals, a first emission, such as a red, green, orange or white emission, at the time t1 and a second distinct emission, such as a red, green, orange or white emission, at the time t2.

Preferably, the first sign is inscribed in a rectangle of centimeter-sized vertical dimension or height H (its horizontal dimension being called width W) and such as to define an angle α between the windshield and the gaze axis of the driver (or passenger), the first sign is characterized by a vertical dimension called the apparent height H' and H is set by the formula H=H'/sin(α).

For example, for a sign of 2 cm (targeted) apparent height H' and for an angle of 25°, H is 4.7 cm. The correction by anamorphosis may therefore be large.

For example, the first sign (pictogram) may be inscribed in a square or a rectangle of H (or better still H') and of W (or better still W) of 1 to 10 cm and better still from 2 to 5 cm. To a lesser extent, it is also possible to seek to compensate the effect of perspective by widening the base of the first sign by a factor (1+H'/(d tan(α))) with respect to its top where d is the distance between the driver (or passenger) and the first sign.

The windshield may include a color filter (for example a red, green, blue or orange color filter) between the in particular white-emitting first OLED device and the first sign and in particular between the first transparent substrate (side opposite the electrodes and therefore face F3 side) for a bottom-emitting OLED and the first sign, on face F4 or face F3 side.

It is also possible to employ it with a color OLED in the case where its emission spectrum does not allow given color coordinates (such as set in a standard for example, or requested by the automobile manufacturer) to be obtained directly. For example, when the emission spectrum is too broad, the color filter then allows at least some thereof to be filtered out.

The color filter preferably includes a colored filtering layer that is F3 side in particular making contact with the face F3:
on the face F3;
or on the first OLED device in particular on the first transparent substrate (side opposite the electrodes and therefore face F3 side) for a bottom-emitting OLED;
or on a curved carrier (or even a substrate) that is common to the first OLED device and to a second OLED device able to illuminate a second sign, said support being transparent in front of the first OLED device which is preferably a bottom-emitting device that therefore emits face F3 side.

It is possible to use various types of filter (having different make-ups and different modes of operation) that act on or modify in a chosen, characterized and reproducible way the light emission of the OLED device (specifically, their light transmission has a different spectral dispersion to that of the light emission of the OLED device). These filters may be colored transparent polymers, colored glasses, the coloration being achieved by deposition or in the bulk thereof, or may be layers deposited on the OLEDs or the lamination interlayer, etc. as explained below.

As mentioned above, one or more absorption filters (this absorption in particular being controlled by inorganic or organic compounds added as appropriate to a matrix made of glass or made of plastic) are preferably used. This type of filter may for example be formed by depositing one or more organic or mineral pigments or dyes (optionally dissolved or dispersed in a medium, in particular such as a silicone, epoxy or acrylic resin, a UV-curable ink, or a mineral sol-gel matrix) on the surface of a transparent bearing element such as the common carrier (on its top face). This element may be a glazing material (soda-lime glass, borosilicate glass, or it may be a question of one of the faces F3 or F4 of the second glazing, preferably face F3, or even of the emission face of the OLED device) or a plastic/polymer (sheet of an in particular thermostabilized polyethylene terephthalate, polycarbonate, acrylate, polyetheretherketone (PEEK), etc. polymer, or it may be a question of one face of the lamination interlayer, or even of the emission face of the OLED device), examples of these filters in particular being gelatin-based filters or the polymer color filters sold by Lee Filters or Rosco. Preferably, the bearing element is the second glazing, the OLED, or the lamination interlayer located between the OLED device and the second glazing. The deposition may be carried out by screen printing, by inkjet or laser printing, by spray coating, by dip coating, by roll coating, etc. and is preferably carried out by screen printing or inkjet printing, in particular on the second glazing and/or the OLED device (and/or optionally on an intermediate element such as a lamination interlayer) in particular and advantageously by inkjet printing.

It will be noted that the colored substances (in particular dyes or pigments) used to produce the aforementioned filters preferably are heat resistant. For example, optionally polychlorinated copper phthalocyanine pigments may advantageously be used, these pigments being used in mixture and dispersed in a resin, in particular a cross-linkable polysiloxane resin, the mixture for example (and advantageously) being applied in particular by screen printing. In the case of inkjet printing, the inks used may in particular be UV-curable inks that are stable with temperature and in light, such as for example the Anapurna M inks sold by Agfa.

The absorption filter advantageously allows the chosen effect or color to be obtained whatever the angle of incidence of the observation.

In another embodiment, one or more filters acting by reflection of light (this reflection in particular being controlled by the interference that occurs within a stack of thin layers made of various materials, a thin layer being a layer the thickness of which is smaller than the wavelength of the light), in particular dichroic filters, filters based on semi-reflective interference stacks (of layers), etc. are used. Such filters are for example produced by (vacuum) physical vapor deposition (PVD) (sputtering, magnetron sputtering, evaporation) or chemical vapor deposition (CVD) of high- and low-refractive-index layers in alternation, the substrate on which the deposition is carried out possibly being a glazing material or a polymer.

The reflection filter allows the chosen effect or color to be obtained on the visual axis of the driver, the perceived effect or color possibly however possibly being different at another incidence.

The interior masking layer may be on face F3 and the one or more first apertures are filled with a transparent layer in particular made of the thermoformable (thermoplastic) material (preferably PVB) or a colored filtering layer.

The first OLED device preferably comprises in this order:
  a (first) substrate (which is preferably dielectric and preferably transparent: plastic or glass film) preferably on face F3 side;
  optionally one or more functional layers:
    barrier layer to moisture (if the substrate is plastic) or barrier layer to alkali metals (if the substrate is glass),
    and/or light-extracting layer: scattering layer, for example enamel or another mineral (sol-gel etc.) or organic binder with scattering particles if glazing substrate or organic (resin) or mineral (sol-gel) binder with scattering particles if plastic substrate,
  a preferably transparent lower electrode (anode);
  a first organic light-emitting system (plurality of emitters of various colors may be stacked);
  a preferably reflective upper electrode;
  and optionally a first overlayer such as an encapsulation layer (deposit or film that is for example polymeric, for example adhesively bonded to the upper electrode, etc.).

The overlayer may make contact with the (in particular PVB) lamination interlayer.

If a second OLED device is (or even more OLEDs are) used between the faces F2 and F3 it (they) may have the same structure and in particular may comprise:
  preferably face F3 side, a substrate (which is preferably dielectric and in particular transparent: glass or plastic film) that is either the first substrate (common substrate) or a distinct second (adjacent) substrate;
  optionally one or more functional layers:
    barrier layer to moisture (if the substrate is plastic) or barrier layer to alkali metals (if the substrate is glass),
    and/or light-extracting layer: scattering layer, for example enamel or another mineral (sol-gel etc.) or organic binder with scattering particles if glazing substrate or organic (resin) or mineral (sol-gel) binder with scattering particles if plastic substrate,
  a preferably transparent lower electrode (anode);
  a second organic light-emitting system (a plurality of emitters of various colors may be stacked), of identical or distinct color to the first system;
  and a preferably reflective upper electrode;
  and optionally an overlayer such as an encapsulation layer (deposit or film that is for example polymeric, for example adhesively bonded to the upper electrode, etc.). The first and second OLED devices may in particular be adjacent and on a common carrier (plastic film, in particular for protecting and/or bearing electrical conductors etc.) that is substrate(s) side or upper electrode side (on the electrodes or on the overlayer).

A plurality of types of OLED are known:
  bottom-emitting OLEDs (emitting through a transparent substrate), the lower electrode being transparent and the upper electrode reflective;
  top-emitting OLEDs (output through the upper electrode), the lower electrode being reflective and the upper electrode transparent; and
  bottom- and top-emitting OLEDs using transparent or semitransparent electrodes.

Preferably, the first OLED device is a bottom-emitting device and the substrate is therefore face F3 (rather than F2) side, and likewise the second (and yet other) adjacent OLED device(s) is (are) (a) bottom-emitting device(s), optionally with a common substrate.

Each (preferably lower) transparent electrode may be a metal grid, for example made of silver (of suitable width), or a transparent electrically conductive layer such as a layer of transparent conductive oxide (TCO) or a stack of thin layers with at least one (thin) metal layer, in particular of silver, between two dielectric layers for example of oxides and/or nitrides of one or more metals (Sn, Zn, etc.) or silicon.

The first OLED device may have one or more technical edges (non-emitting zones) for the supply of electrical power on the periphery of the emitting zone, typically consisting of one or more strips in particular flanking the emitting zone. This technical edge may be a current-distributing zone. A technical edge may be of width W2 at most 2 cm and preferably of at most 1 cm or even at most 6 mm or 5 mm.

The one or more first discontinuities forming a pictogram in particular are preferably apertures in the interior masking layer the shape of which is adjusted to the pattern sought for said pictogram. These apertures may be produced by removing material or the pattern is formed by masking during the deposition of the opaque layer.

The discontinuities may be patterns (rows) of width of 1 to 10 mm or even 5 mm for rows or of 1 to 10 cm or 5 cm for more expanded patterns.

It may be desirable for the first sign and the adjacent second and other signs to be aligned in a single row rather than superposed in the masking zone.

Preferably, the (preferably enamel) interior masking layer masks the one or more technical edges of the first OLED device and even masks any electrical connector (which would otherwise be seen) that is present between the faces F2 and F3 and connected to the first OLED device i.e. a connector such as a cable, one or more wires, a conductive film, etc.

Preferably, the (width and/or height of the) first OLED device extends beyond the first sign for example by at least 5 mm and even at least 1 cm in order for the light-emitting zone of the OLED to easily face the one or more first discontinuities.

Also preferably, the (preferably enamel) interior masking layer masks the one or more technical edges of the first OLED device and even masks any electrical connector (which would otherwise be seen) that is present between the faces F2 and F3 and connected to the first OLED device i.e. a connector such as a cable, one or more wires, a conductive film, etc.

In a given peripheral zone it may be desired for there to be a plurality of luminous signs (pictograms, etc.) side-by-side (aligned for example or in a corner of the windshield, etc.). Preferably, one or more second discontinuities of the interior masking layer also forms a second sign, made up of one or more symbols and/or letters, which sign is in particular adjacent to the first sign spaced apart by at least 1 cm and better still at least 2 cm (because of the technical edges that are most often at least 5 mm as already indicated). A second curved organic light-emitting-diode device i.e. OLED device is between the faces F2 and F3, said second OLED device being distinct from the first OLED device, being able (and dedicated) to illuminate the second sign.

Furthermore, the first and second OLED devices are preferably (mounted) on a common carrier (optionally forming a common substrate) and preferably mounted on a curved common carrier (that is distinct from the one or more substrates) of preferably subcentimeter-sized thickness E2' with E2+E'2 smaller than E3, and therefore light emission side or bottom side. In particular, the common carrier (preferably a plastic film) may, light emission side (face F3 side), be against or adhesively bonded to the first and second substrates of the OLEDs, which in particular are bottom-emitting. In particular, the common carrier may, bottom (face F2) side, be against or adhesively bonded to the first and second upper electrodes or to first and second overlayers that are on the first and second upper electrodes of the OLEDs, which in particular are bottom-emitting.

The first and second OLED devices, which in particular are bottom-emitting, are in particular adhesively bonded (glue, double-sided adhesive) to the common carrier or placed on the common carrier. The first and second OLED devices may be joined to the common carrier by one or more solder bumps (for example 2 or 4 solder bumps). This common carrier may be of thickness E2' of at most 0.15 mm and even of at most 0.1 mm. Its general shape may be that of a rectangular strip (band) along the first (longitudinal or lateral) edge, said strip optionally being L-shaped with a dog-legged portion for the electrical connections.

This common carrier may be dielectric and even transparent in particular:
  in particular chemically tempered glass;
  or plastic (polymer): such as a PET, polyamide (including kapton), PEEK;
  or even a conductive metal sheet (if bottom side).

The common carrier advantageously serves:
  to handle and assemble more easily a set of premounted OLEDs;
  to more easily produce the electrical connections;
  as a mechanical reinforcement.

The common carrier may, bottom side, be against or adhesively bonded (double-sided adhesive, glue) to the face F2 or the common carrier may, top (light-emitter) side be against or adhesively bonded (double-sided adhesive, glue) to F3. The common carrier may, bottom side, be separated from the face F2 by the lamination interlayer, which is in particular made of PVB. The common carrier may, top side, be separated from the face F3 by the lamination interlayer, which is in particular made of PVB.

The common carrier may, top side or bottom side, be encapsulated in the lamination interlayer, which is in particular made of PVB if 2 or 3 in particular PVB sheets (central sheet apertured to house the common carrier) are used for the lamination.

The common carrier may:
  bear electrical conductors (wires, tracks, a layer with insulating discontinuities, etc.) supplying the first OLED device and the second OLED device with electrical power, and in particular be masked by the interior masking layer (and/or optionally a trim of the vehicle, the dashboard, etc.);
  and/or extend beyond the edge face of the windshield (if it is dog-legged it has a dog-legged portion or strip that extends beyond the edge face of the windshield) and/or be curved and extend as far as (the border of) the face F4 and be against or adhesively bonded to the face F4;
  and/or bear one or more first electronic components including a first microcontroller (driver) addressing the first OLED device and regulating the electrical power supply (preferably the current) of the first OLED device and even one or more second electronic components including a second microcontroller addressing the second OLED device and regulating the electrical power supply (preferably the current) of the second OLED device.

Each microcontroller identifies in the control signal whether a command is intended for its dedicated sign and adjusts the level (the magnitude of the current for example) accordingly.

For each OLED on the common carrier, there are preferably two electrical conductors for the control signal decoded by the dedicated microcontroller and two electrical conductors for the power signal connected to the microcontroller.

A subset of pictograms, such as bars and/or combined with letters, may be selectively illuminated in real time to form simply an indicator of (oil, gasoline) level, of speed, of a state of wear, etc.

Moreover, provision may be made for means for modulating the power of the OLEDs between at least two configurations: a configuration for nighttime driving, in which the power of the first OLED device is adjusted so that the luminance of the first sign is typically comprised between about 30 and about 100 $Cd/m^2$ and a configuration for daytime driving, in which the power of the first OLED device is adjusted so that the luminance of the first sign is typically comprised between about 200 and about 2000 $Cd/m^2$. During the day, the luminance may possibly also be adjusted depending on exterior lighting conditions, in particular with a sensor for sensing natural light in the windshield or elsewhere in the vehicle: if it is very sunny the OLED is made to emit strongly and if it is cloudy less strongly in order not to dazzle.

If necessary, a transparent protective film or transparent protective varnish may cover the common carrier and OLED device assembly. For example, it may be a question of a transparent protective epoxy varnish for example of the same type as that sold by MARABU under the reference MARABU GL 914®.

The common carrier, when it is located top side, is transparent (material such as a PET or polyamide) and may bear a common color filter or a color filter dedicated to any OLED device requiring it (filter assembly side or side opposite the assembly), in particular a set of dye layers.

The first OLED device, which in particular is bottom-emitting, may be covered with a dielectric protective layer that optionally bears electrical conductors that supply the first OLED device with power—this layer being a contact adhesive film or a film with an adhesive main face or even a deposited layer (varnish, resin, wet deposit)—. Optionally, this protective layer extends beyond one or more edges of the first OLED device and covers a second OLED device that is adjacent to the first OLED device and that is in particular bottom-emitting and is able to illuminate a second pictogram.

When the protective layer extends beyond one or more edges of the first OLED device it may be light emission side (on the upper electrode which is chosen to be transparent) or on the side opposite the light emission side (on the upper electrode which is chosen to be reflective, and in particular made of aluminum or silver).

When the protective layer extends beyond one or more edges of the first OLED device it may be:
- a film bearing the first and second OLED devices, which are in particular bottom-emitting, and in particular bearing distinct first and second substrates;
- an adhesive film covering a common carrier (glass, plastic film, etc.)—that may be a common substrate—bearing the first and second OLED devices, which in particular are bottom-emitting;
- an adhesive film on face F2 if the first OLED device, which in particular is bottom-emitting, is against or adhesively (pre)bonded to the face F2 (likewise the second OLED device);
- a layer deposited on the common carrier—which may be a common substrate—bearing the first and second OLED devices, which in particular are bottom-emitting.

Moreover, the first OLED device may be arranged in a plurality of configurations with respect to the lamination interlayer.

In a first embodiment:
- the first OLED device is mounted on face F2 directly or via a carrier that is common to a second OLED device that is adjacent to the first OLED device and that is able to illuminate a second sign, said first OLED device in particular being adhesively bonded by a double-sided adhesive, and, optionally, the first bonding main face is apertured plumb with the first OLED device (active zone and technical edges), in particular with an excess thickness of lamination interlayer with respect to the first OLED device leaving a space (between the face F3 and the OLED) preferably of height of at most 0.4 mm or of at most 0.3 mm, and indeed even plumb with the optional second OLED device, the lamination interlayer preferably covering the optional common carrier (and even encapsulating it);
- or the first OLED device is mounted on face F3 directly or via a carrier that is common to a second OLED device that is adjacent to the first OLED device and that is able to illuminate a second sign, said first OLED device in particular being adhesively bonded by a transparent double-sided adhesive, and the second bonding main face is optionally apertured plumb with the first OLED device (active zone and technical edges) in particular with an excess thickness of lamination interlayer with respect to the first OLED device leaving a space (between the face F2 and the OLED) preferably of height of at most 0.4 mm or of at most 0.3 mm, and indeed even plumb with the optional second OLED device, the lamination interlayer preferably covering the optional common carrier (and even encapsulating it).

Producing the hole plumb with the first OLED device makes it possible to ensure a better lamination.

If the first OLED device is of thickness E2 smaller than 0.15 mm or even better still than 0.1 mm, it is possible to easily laminate it between two interlayer sheets.

If the first OLED device is of a thickness larger than 0.15 mm or even than 0.1 mm, it may be preferable to laminate it with three interlayer sheets and preferably with a central sheet thickness substantially equal to E2 or to E'2+E2 if it is on a common carrier.

A reserve may be formed in a central sheet or a single sheet:
- to house the first OLED device (if individual);
- to house the common carrier bearing the first OLED device.

Whether it be the only sheet or not, as many reserves for housing only the OLED devices may be formed, this sheet covering the common carrier bearing the OLED devices.

The first OLED device may be within the lamination interlayer, and therefore the first OLED device is encapsulated by the thermoformable material with a nonzero thickness E21 of lamination interlayer F2 side and with a nonzero thickness E22 F3 side, E21 and E22 not necessarily being equal.

The thermoformable material from which said interlayer is made is chosen from the group containing the polyvinyl butyrals (PVBs) such as RC41 from Solutia or from Eastman, the plasticized polyvinyl chlorides (PVCs), polyurethane (PU) or the ethylene vinyl acetates (EVAs). Preferably, the thermoformable material is polyvinyl butyral (PVB) that optionally has a wedge-shaped transverse cross section that decreases from the top of the laminated glazing to the bottom.

The lamination interlayer may have a wedge-shaped transverse cross section that decreases from the top of the laminated windshield to the bottom in particular to avoid double images in the case of an additional head-up display (HUD).

It may be desired to preserve the acoustic properties of the windshields. Thus, the lamination interlayer may comprise at least one what is called middle layer made of a viscoelastic plastic having vibro-acoustic damping properties and in particular based on polyvinyl butyral and plasticizer, the interlayer furthermore comprising two external layers made of standard PVB, the middle layer being between the two external layers.

Furthermore, if provision is to be made for use of a head-up display type device, one of the two external layers optionally has a wedge-shaped transverse cross section that decreases from the top of the laminated glazing to the bottom, the layer made of a viscoelastic plastic having vibro-acoustic damping properties having a constant transverse cross section from the top of the laminated glazing to the bottom.

The interior (exterior, respectively) masking layer may be a layer of black enamel, a layer of paint or an opaque ink preferably on the face F2 (F3 or F4, respectively) or on the lamination interlayer or even on an additional (PET etc.) carrier film.

Advantageously, the exterior and interior masking layers are made of the same material (preferably of an enamel, in particular a black enamel) and on F2 and F3 or on F2 and F4.

The first glazing and likewise the second glazing may be parallelepipedal, with panes or main faces that are rectangular, square or even any other shape (round, oval, polygonal). It may be large in size, for example of area larger than 0.5 or 1 m$^2$.

The first and/or second glazing may (depending on the esthetic rendering or the desired optical effect) be a clear glass (light transmission $T_L$ higher than or equal to 90% for a thickness of 4 mm), for example a glass of standard soda-lime composition such as Planilux® from Saint-Gobain Glass, or an extra-clear glass ($T_L$ higher than or equal to 91.5% for a thickness of 4 mm), for example a soda-lime-silica glass with less than 0.05% Fe III or $Fe_2O_3$ such as the glass Diamant® from Saint-Gobain Glass, or the glass Optiwhite® from Pilkington or the glass B270® from Schott, or a glass of another composition described in document WO04/025334.

The glass of the first and/or second glazing may be neutral (no tint), or (slightly) tinted, in particular grey or green, such as the glass VENUS or TSA from Saint-Gobain Glass. The glass of the first and/or second glazing may have undergone a chemical or thermal treatment such as a toughening, annealing or tempering treatment (in particular to obtain a better mechanical strength) or be semi-tempered.

The light transmission $T_L$ may be measured according to standard ISO 9050:2003 using illuminant D65, and is the total transmission (in particular integrated over the domain of the visible and weighted by the curve of sensitivity of the human eye) taking into account both direct transmission and possible diffuse transmission, the measurement for example being carried out using a spectrophotometer equipped with an integrating sphere, the measurement at a given thickness then being converted if need be to the reference thickness of 4 mm according to standard ISO 9050:2003.

For a windshield, the $T_L$ may preferably be at least 70% and even at least 75%.

In one embodiment, the first glazing is made of mineral glass and the second glazing is made of organic glass (such as PC, PMMA, cyclic-olefin copolymer (COC) or even polyethylene terephthalate (PET) optionally protected by a coating (on face F4).

The exterior glazing may include thin functional layers on either one of its faces F1 and F2 or indeed both thereof: mention may be made of a hydrophobic or self-cleaning photocatalytic layer on face F1 and of a layer or a stack of thin layers that reflect solar radiation on face F2 (and serving to form one or more capacitive sensors, an antenna, etc.).

In order to limit heating of the passenger compartment or to limit the use of air conditioning, one of the glazings at least (preferably the exterior glass) is tinted, and the laminated glazing may also include a layer that reflects or absorbs solar radiation, preferably on face F4 or on face F2 or F3, in particular:

a layer of transparent electrically conductive oxide called a TCO layer (on face F4) or a stack of thin layers comprising at least one TCO layer; and/or
  a stack of thin layers comprising at least one silver layer (on F2 or F3), the or each silver layer being placed between dielectric layers.

It is possible to place both a (silver-containing) layer on face F2 and/or F3 and a TCO layer on face F4.

The TCO layer (of a transparent electrically conductive oxide) is preferably a layer of fluorine-doped tin oxide ($SnO_2$:F) or a layer of indium tin oxide (ITO). For layers made of ITO, the thickness will generally be at least 40 nm, or even at least 50 nm and even at least 70 nm, and often at most 150 nm or at most 200 nm. For layers made of fluorine-doped tin oxide, the thickness will generally be at least 120 nm, or even at least 200 nm and often at most 500 nm. For example, the low-emissivity layer comprises the following sequence: high-index sublayer/low-index sublayer/a TCO layer/optional dielectric overlayer. By way of preferred example of low-emissivity layer (protected during a temper) the following may be chosen: high-index sublayer (<40 nm)/low-index sublayer (<30 nm)/an ITO layer/high-index overlayer (5-15 nm)/low-index barrier overlayer (<90 nm)/last layer (<10 nm). Mention may be made, by way of low-emissivity layer, of the layers described in patent US 2015/0146286, on face F4, in particular in examples 1 to 3.

The transparent layer on F3 or F4 may be electrically insulated or even absent from the zone facing the first sign (of the first OLED device) for reasons of color.

The face F3 may therefore include a heating layer, which is preferably neutral in transmission, optionally under the interior masking layer on F3, which layer is surmounted by first and second current-distributing strips that are typically on the first and second longitudinal edges and that in particular are opaque and for example made of a silver-containing enamel.

Furthermore, the first sign, in particular when it is on a first longitudinal edge, may be set apart from an opaque first current-distributing strip of a heating layer on F3. The first current-distributing strip may be more central than the first sign.

The invention and its advantages will be better understood on reading the following description of nonlimiting embodiments, which description is given below with reference to the following figures.

FIG. 1 shows a passenger compartment side front view of a first windshield comprising internal luminous signs according to the present invention.

FIG. 1' shows a passenger compartment side front view of a second windshield comprising internal luminous signs according to the present invention.

FIG. 1" shows a partial passenger compartment side front view of a third windshield comprising internal luminous signs according to the present invention.

FIG. 1i is a side view that shows the inclination of a windshield with an internal luminous sign according to the invention and FIG. 1j shows signs stretched in the vertical direction to compensate for the effect of the inclination.

FIG. 1a shows a partial lateral cross-sectional view of a laminated windshield comprising one or more internal luminous signs according to the present invention.

FIG. 1b shows a partial longitudinal cross-sectional view of a laminated windshield comprising one or more internal luminous signs according to the present invention.

FIG. 2a shows a partial lateral cross-sectional view of a laminated windshield comprising one or more internal luminous signs according to the present invention.

FIG. 2b shows a partial longitudinal cross-sectional view of a laminated windshield comprising one or more internal luminous signs according to the present invention.

FIG. 2c shows a partial lateral cross-sectional view of a laminated windshield comprising one or more internal luminous signs according to the present invention.

FIG. 2d shows a partial longitudinal cross-sectional view of a laminated windshield comprising one or more internal luminous signs according to the present invention.

FIG. 3 shows an exploded partial longitudinal cross-sectional view of a laminated windshield comprising one or more internal luminous signs according to the present invention.

FIG. 3a shows an exploded partial lateral cross-sectional view of a laminated windshield comprising one or more internal luminous signs according to the present invention.

FIG. 3b shows an exploded partial lateral cross-sectional view of a laminated windshield comprising one or more internal luminous signs according to the present invention.

FIG. 4 shows an exploded partial longitudinal cross-sectional view of a laminated windshield comprising one or more internal luminous signs according to the present invention.

FIG. 5 shows an exploded partial longitudinal cross-sectional view of a laminated windshield comprising one or more internal luminous signs according to the present invention.

FIG. 5' shows an exploded partial lateral cross-sectional view of a laminated windshield comprising one or more internal luminous signs according to the present invention.

Figure 6:
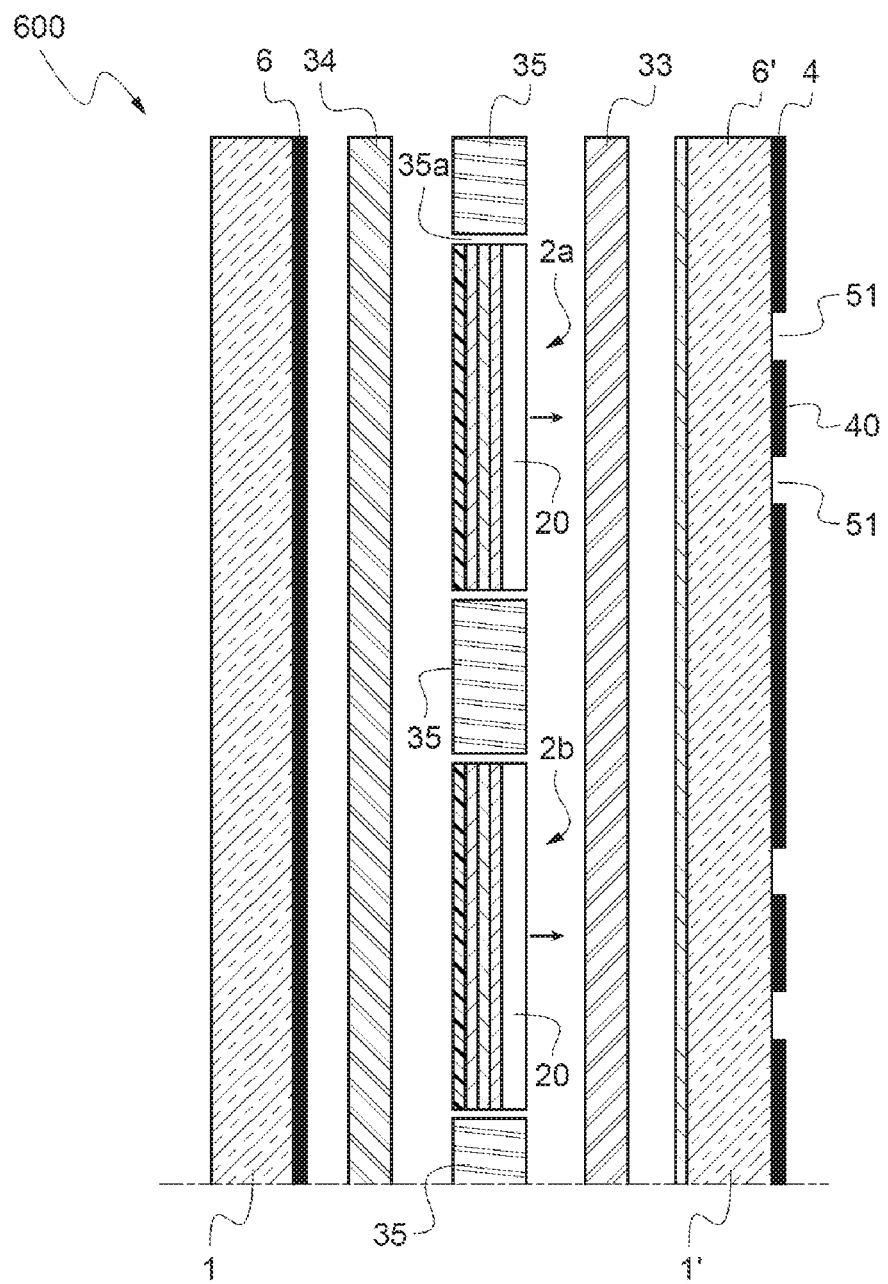

FIG. 6 shows an exploded partial longitudinal cross-sectional view of a laminated windshield comprising one or more internal luminous signs according to the present invention.

FIG. 6' shows an exploded partial lateral cross-sectional view of a laminated windshield comprising one or more internal luminous signs according to the present invention.

FIG. 7 shows a partial cross-sectional view of a laminated windshield comprising one or more internal luminous signs according to the present invention.

Figure 8:
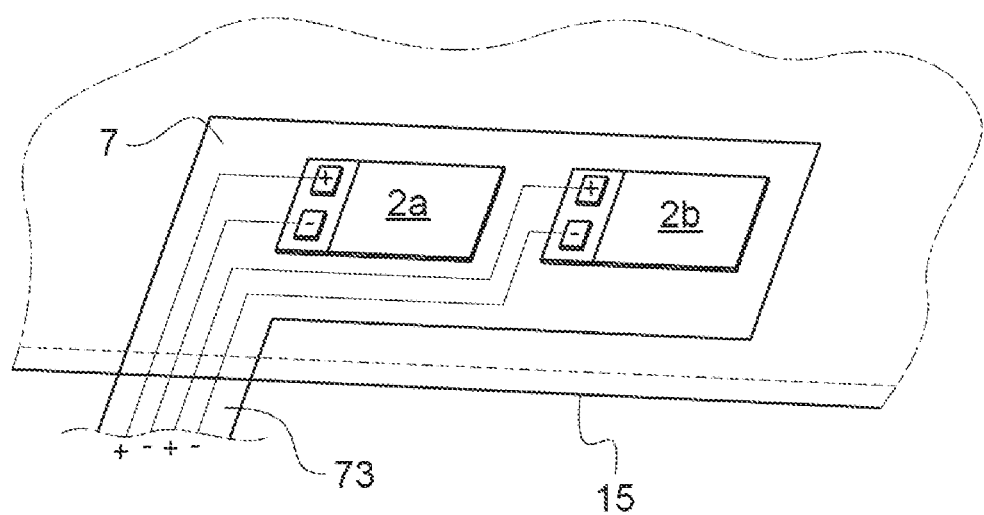

FIG. 8 shows a perspective view of a common carrier bearing two OLED devices for backlighting and bearing current-distributing conductors, the carrier being laminated in the windshield.

Figure 9:
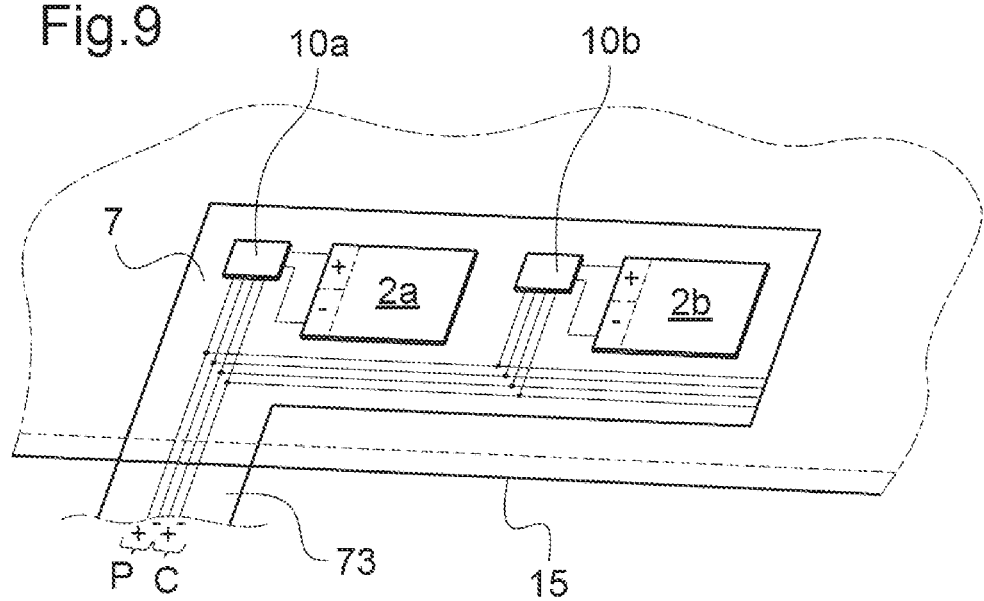

FIG. 9 shows a perspective view of a common carrier bearing two OLED devices for backlighting and bearing the current-distributing conductors of two microcontrollers, the carrier being laminated in the windshield.

FIG. 1 shows a passenger compartment side front view of a windshield comprising internal luminous signs according to the present invention.

The windshield 1000 is laminated and includes a first curved external glazing with main faces F1 (the outermost face) and F2, a polymeric lamination interlayer made of a material such as a PVB, and a second curved internal glazing 1' with main faces F3 and F4 (the innermost face).

It is of a rectangular shape defined by its lateral and longitudinal edges and has an opaque peripheral border, that here is black, on face F2 and on face F3 or on F2 and F4.

The interior masking layer 4 is opaque and may be made of a black enamel deposited on face 13 or F3 or face 14 or F4 of the internal glass 1', made of paint or of an optically opaque ink deposited on the polymer interlayer, or of an added, tinted or painted, opaque polymer layer laminated between the interior glass and the interlayer.

This layer is deposited using any technique known to those skilled in the art, for example, nonlimitingly, using screen-printing techniques, inkjet-printing techniques or even rotogravure-, flexographic or offset-printing techniques.

This layer 4 contains discontinuities 51 forming signs such as pictograms. These are apertures in the masking layer 4, the shape of which is adjusted to each pattern sought. These are in particular apertured zones of the masking layer 4, i.e. zones lacking masking material (enamel), and the shape of which corresponds to the pattern recognized by the driver (or the passenger) such as simple and immediate information during the illumination of this zone by a first OLED device, each apertured zone thus being backlit.

As a result, the visual information is borne by the interior masking layer.

A plurality of signs, each backlit by a dedicated OLED device, are located along the lower longitudinal edge 15a (in mounted position) in particular driver side, above all when the signs are driver aids (requiring a rapid reaction from the driver. For example the OLED devices are on a common carrier 7 (not visible but shown by a dashed line).

Mention may be made of:
an indicator indicating excess speed ("SPEED" in letters) that lights up optionally red or optionally orange when the limit is almost reached;
an anti-frontal-collision diagnostic that for example turns on if the vehicle is too close to the vehicle (automobile, motorcycle, etc.) in front i.e. not respecting the stopping distance;
a hazard warning light that turns on in case of danger.

A plurality of signs, each backlit by a dedicated OLED device, are located along the upper longitudinal edge 15b (in mounted position) in particular in the central position conventionally used for fastening the rearview mirror, the OLED devices for example being on a common carrier 7 (not visible but shown by a dashed line).

A plurality of signs, each backlit by a dedicated OLED device, are located along the left lateral edge 15c (in mounted position) the OLED devices for example being on a common carrier 7 (not visible but shown by a dashed line). Mention may be made of:
pictograms on the state of the vehicle: oil level, temperature, door poorly closed, seatbelt not fastened;
pictograms on whether the lights are turned on or not.

A plurality of signs, each backlit by a dedicated OLED device, are located along the right lateral edge 15d (in mounted position) the OLED devices for example being on a common carrier 7 (not visible but shown by a dashed line). Mention may be made of:
pictograms about the door (poorly closed), the safety belt (not fastened);
pictograms about the air conditioning, fans;

pictograms giving information about the external environment:—an indicator indicating a friend is located in proximity to the vehicle;
an indicator indicating connectivity to a telecommunications network.

The width of the enamel strip 4 is judiciously larger in the zones of the signs.

FIG. 1' shows a passenger compartment side front view of a second windshield comprising internal luminous signs according to the present invention.

A plurality of signs, each backlit by a dedicated OLED device, are located along the lower longitudinal edge 15a driver side (in mounted position) the OLED devices for example being on a common carrier 7 (not visible but shown by a dashed line).

Mention may be made of:
an anti-left-lateral-collision diagnostic that for example turns on if an overtaking vehicle and/or a vehicle in the left-hand lane is too close;
an anti-right-lateral-collision diagnostic that for example turns on if a vehicle in the right-hand lane is too close;
a lane-position diagnostic that for example turns on if the vehicle being driven is too far to the left or too far to the right in its lane.

The common carrier may be L-shaped so as to extend each side of a corner, such as here over the left lateral edge 15c and the upper longitudinal edge 15b.

FIG. 1" shows a partial passenger compartment side front view of a third windshield comprising internal luminous signs according to the present invention.

A pictogram, for example here the hazard warning light, may be isolated from the other pictograms with an extra thickness of enamel dedicated to this pictogram. For example, the first OLED device is here mounted on face F2 or F3 or laminated between face F2 and F3 (without common carrier).

FIG. 1i is a side view that shows the steep inclination of a windshield with an internal luminous sign according to the invention of actual height H and of apparent height H' (as perceived by the driver located opposite).

For example, the angle α is about 25°.

Furthermore, FIG. 1j shows signs stretched in the vertical direction in order to compensate for the effect of the inclination.

FIG. 1a shows a partial lateral cross-sectional view of a laminated windshield 100a comprising one or more internal luminous signs according to the present invention.

The laminated vehicle windshield 100a including one or more internal luminous signs, comprises:
a first curved glazing that is preferably made of mineral glass and optionally tinted, in particular grey or green, with a first main face called F1 that is intended to be exterior side of the vehicle and an opposite second main face called F2, said glazing being of thickness E1 of preferably at most 2.5 mm, and even of at most 2 mm—in particular 1.9 mm, 1.8 mm, 1.6 mm and 1.4 mm—or even of at most 1.3 mm or of at most 1 mm, for example made of the glass TSA (by the applicant company) and of thickness 2.1 mm;
a second curved (just like the first glazing) glazing that is preferably made of mineral glass, with a third main face called F3 and an opposite fourth main face called F4 that is in particular intended to be interior side of the vehicle, of thickness E1 preferably being smaller than E1, and even of at most 2 mm—in particular 1.9 mm, 1.8 mm, 1.6 mm and 1.4 mm—or even of at most 1.3 mm or of at most 1 mm, the total thickness of the glazings E1+E'1 preferably being strictly smaller than 4 mm and even than 3.7 mm, for example made of the glass TSA (by the applicant company) and of thickness 2.1 mm,
said first and second glazings being connected together via the faces F2 and F3 by a lamination interlayer made of (clear or extra-clear) thermoformable and preferably thermoplastic polymeric material and even of PVB and of (total) thickness E3 of at most 2.2 mm and better still of at most 2 mm, of at most 1.5 mm or even of at most 1 mm, said interlayer being made up of 1, 2 or 3 sheets for example and in particular being set back from the edge face of the second glazing (by at most 5 mm or even at most 2 mm or at most 1 mm) and even set back from the edge face of the first glazing (by at most 5 mm or even at most 2 mm or at most 1 mm), said interlayer including a first bonding main face, face F2 side and a second bonding main face, face F3 side;
a first peripheral layer called the interior masking layer 4 made of an opaque material that, along a border of face F3, on face F4, in particular along a border of face F4—in particular (directly) on face F4 is discontinuous and thus comprising one or more first discontinuities 51 forming a first sign made up of one or more symbols and/or letters; and
a second peripheral layer called the exterior masking layer 6 made of opaque material on face F2, which faces the interior masking layer and the one or more first discontinuities—along a border of the face F2.

Furthermore, a first curved (because flexible and soft) organic-light-emitting-diode device called an OLED device is between the faces F2 and F30, being able to illuminate the first sign (by backlighting), thus facing the first sign, and facing the interior masking layer, and able to emit light only toward the first sign.

The first OLED device 2 is of preferably subcentimeter-sized thickness E2 smaller than E3 and even of at most 0.5 mm and better still of at most 0.35 mm and in particular of thickness substantially equal to the thickness of one thermoplastic sheet and therefore of 0.76 mm, 0.38 mm or 0.17 mm thickness.

The first OLED device is for example individual (not borne with another OLED device on a common carrier) and is here encapsulated by the thermoformable material by means of two or three PVB sheets.

A functional layer, such as a transparent conductive layer 6', may be on face F3 and may serve for example as an anti-solar or heating (anti-fog, etc.) layer. If necessary, for reasons of color, this layer may be removed in the one or more signs zones.

The interior masking layer 4 and the exterior masking layer 6 are made of the same material and preferably of an enamel.

FIG. 1b shows a partial longitudinal cross-sectional view of a laminated windshield 100b comprising one or more internal luminous signs according to the present invention. The laminated vehicle windshield 100b including one or more internal luminous signs differs from the windshield 100a in that a flexible common carrier 7 bears a plurality of (here two) OLED devices, each dedicated to backlighting a given sign.

The flexible common carrier 7 is here behind the OLED devices. It may advantageously bear electrical conductors for supplying the OLED devices with electrical power and extend as far as an edge of the windshield and even extend beyond the windshield in order to simplify the electrical connections.

The flexible common carrier 7 may be a thin plastic such as a PET, of at most 0.2 mm thickness, or even a glass, in particular a chemically tempered glass. It is not necessarily transparent and does not necessarily bear transparent conductors because it is masked by the layer 4 (and the layer 6).

FIG. 2a shows a partial lateral cross-sectional view of a laminated windshield 200a comprising one or more internal luminous signs according to the present invention.

The laminated vehicle windshield 200a including one or more internal luminous signs differs from the windshield 100a in that a colored filtering layer 9 is deposited (sol-gel, etc.) or is a film against or fastened to the face F3 directly or fastened to the optional functional layer 6'. In this case, it may serve to choose the color if a white-emitting OLED device is used or to adjust the color emitted by a colored OLED device.

FIG. 2b shows a partial longitudinal cross-sectional view of a laminated windshield 200b comprising one or more internal luminous signs according to the present invention. The laminated vehicle windshield 200b including one or more internal luminous signs differs from the windshield 100b in that a colored filtering layer 9a, 9b is deposited (sol-gel, etc.) on the OLED devices. In this case, it may serve to choose the color if a white-emitting OLED device is used or to adjust the color emitted by a colored OLED device.

FIG. 2c shows a partial lateral cross-sectional view of a laminated windshield 200c comprising one or more internal luminous signs according to the present invention.

The laminated vehicle windshield 200c including one or more internal luminous signs differs from the windshield 100a in that:
  the layer 4 is deposited (preferably) on face F3 directly or on the optional functional layer 6';
  a colored filtering layer 9 is deposited (preferably) on face F3 directly or on the optional functional layer 6'.

For example, the layer 4 and the filtering layer 9 are made of enamel.

An all-enamel alternative is possible face F4 side.

FIG. 2d shows a partial longitudinal cross-sectional view of a laminated windshield comprising one or more internal luminous signs according to the present invention.

The laminated vehicle windshield 200c including one or more internal luminous signs differs from the windshield 200b in that the (transparent) common carrier 7' is on the emission face side of the OLED devices 2a and 2b. Its bottom face 71' (face F2 side) bears the OLED devices 2a and 2b. Its top side 71' (face F3 side) bears the colored filtering layers 9a and 9b. Alternatively, the colored filtering layers 9a and 9b could be on its bottom face 71' (face F2 side).

FIG. 3 shows an exploded partial longitudinal cross-sectional view of a laminated windshield comprising one or more internal luminous signs according to the present invention (for the sake of simplicity the elements have not been drawn curved i.e. with a curvature).

The first and second OLED devices 2a and 2b are chosen to be bottom-emitting devices and each includes:
  a, for example plastic (PET etc.) or (tempered) glass, first curved transparent substrate 20 bearing:
  a transparent lower electrode (closest to the substrate) 21 that is for example made of ITO or a metal (silver, etc.) grid;
  a first organic light-emitting system 22;
  a reflective electrode that is called the upper electrode (the furthest from the substrate) 23 and for example made of aluminum or silver;
  a varnish or a protective film 24, for example made of kapton, that is adhesively bonded to and optionally extends beyond the upper electrode and that comprises contact lands for the electrodes.

Each device is adhesively bonded by a glue 8 or a double-sided adhesive to the common carrier 7, which is bottommost. The OLED devices may be against the face 72 of the carrier and attached just by solder bumps between contacts of the electrodes and conductors on the face 72. These contacts may be on the same side of the OLED device, for example 21a and 23a.

FIG. 3a shows an exploded partial lateral cross-sectional view of a laminated windshield 300a comprising one or more internal luminous signs according to the present invention (for the sake of simplicity the elements have not been drawn curved i.e. with a curvature).

It illustrates one possible way of laminating a bottom-emitting (or optionally top-emitting if flipped) first OLED device 2 based on 3 preferably PVB sheets:
  two external sheets 33 and 34 making contact with F2 and F3;
  an apertured central sheet (with a void 35a) on the perimeter of the common carrier 7 and of substantially the same thickness as the OLED device and carrier assembly.

This sheet 33 may be optional.

FIG. 3b shows an exploded partial lateral cross-sectional view of a laminated windshield 300b comprising one or more internal luminous signs according to the present invention (for the sake of simplicity the elements have not been drawn curved i.e. with a curvature).

It illustrates one possible way of laminating a bottom-emitting (or optionally top-emitting if flipped) first OLED device 2 based on two preferably PVB sheets:
  an external sheet 33 face F2 side;
  an apertured sheet 34 (with a void 34a) on the perimeter of the first OLED device and with a (slight) excess thickness with respect to the top face of the substrate 20.

This sheet 33 may be optional.

FIG. 4 shows an exploded partial longitudinal cross-sectional view of a laminated windshield 400 comprising one or more internal luminous signs according to the present invention (for the sake of simplicity the elements have not been drawn curved i.e. with a curvature).

It differs from the windshield 300 in that the carrier 7 itself plays the role of the protective film protecting the upper electrode 23. The carrier 7 may be adhesively bonded to the upper electrode.

FIG. 5 shows an exploded partial longitudinal cross-sectional view of a laminated windshield comprising one or more internal luminous signs according to the present invention (for the sake of simplicity the elements have not been drawn curved i.e. with a curvature).

It differs from the windshield 300 in that the carrier 7' is top side. It is transparent and could be made of PET or glass. The top face of the substrate may be adhesively bonded to face 71'.

The OLED devices 2a and 2b may be against the face 71' of the carrier 7' and attached just by solder bumps between contacts of the electrodes and conductors on the face 71'. These contacts may be on the same side of the OLED device, for example side 21a and 23a.

FIG. 5' shows an exploded partial lateral cross-sectional view of a laminated windshield 500' comprising one or more internal luminous signs according to the present invention (for the sake of simplicity the elements have not been drawn curved i.e. with a curvature). It illustrates one possible way of laminating a bottom-emitting (or optionally top-emitting if flipped) first OLED device 2 based on 3 preferably PVB sheets:

- two external sheets 33 and 34 making contact with F2 and F3;
- an apertured central sheet (with a void 35a) on the perimeter of the top side common carrier 7' and of substantially the same thickness as the OLED device and carrier assembly 7'.

This sheet 34 may be optional.

FIG. 6 shows an exploded partial longitudinal cross-sectional view of a laminated windshield 600 comprising one or more internal luminous signs according to the present invention (for the sake of simplicity the elements have not been drawn curved i.e. with a curvature).

It illustrates one possible way of laminating a bottom-emitting (or optionally top-emitting if flipped) first OLED device 2 based on 3 preferably PVB sheets:

- two external sheets 33 and 34 making contact with F2 and F3;
- an apertured central sheet 35 (with a void 35a) on the perimeter of each OLED device 2a and 2b (without common carrier) and of substantially the same thickness as the OLED device.

This sheet 33 may be optional.

FIG. 6' shows an exploded partial lateral cross-sectional view of a laminated windshield 600' comprising one or more internal luminous signs according to the present invention (for the sake of simplicity the elements have not been drawn curved i.e. with a curvature).

It illustrates one possible way of laminating a bottom-emitting (or optionally top-emitting if flipped) first OLED device 2 based on 2 preferably PVB sheets:

- an external sheet 33 making contact with F2;
- an apertured central sheet 34 (with a void 34a) on the perimeter of the OLED device 2 (without common carrier) and with an excess thickness with respect to the top face of the substrate 20.

This sheet 33 may be optional.

FIG. 7 shows a partial cross-sectional view of a laminated windshield 700 comprising one or more internal luminous signs according to the present invention (for the sake of simplicity the elements have not been drawn curved i.e. with a curvature).

The OLED device 2 may have a substrate or be on a carrier (common to other OLED devices) with a curved portion 26 extending beyond the edge of the windshield and as far as the face F4, said portion being adhesively bonded to the face F4 by an adhesive 7a. The body of the automobile is itself adhesively bonded in this location by an adhesive bead 7b.

As here, provision may be made to recess the internal glass 1' in order to make it easy to fold the portion onto the face F4 and to increase compactness.

The distance D between the (longitudinal) edge of the glazing and the base of the first sign may be at least 5 cm, 8 cm or 10 cm. The distance D between the (longitudinal) edge of the glazing and the base of the first sign may be at most 25 cm, and even at most 20 cm.

FIG. 8 shows a perspective view of a common carrier 7 bearing two OLED devices 2a and 2b for backlighting, and bearing current-distributing conductors, the common carrier 7 being laminated in the windshield and with a dog-legged portion 73 exiting via the edge face 15.

FIG. 9 shows a perspective view of a common carrier bearing two OLED devices for backlighting, and bearing current-distributing conductors and two microcontrollers 10a and 10b, the common carrier 7 being laminated in the windshield and with a dog-legged portion 73 exiting via the edge face 15.

The invention claimed is:

1. A laminated vehicle windshield including one or more internal luminous signs, comprising:
   a first curved glazing with a first main face, which first main face is intended to be on an exterior side of the vehicle, and an opposite second main face;
   a second curved glazing with a third main face and an opposite fourth main face, which fourth main face is intended to be on an interior side of the vehicle, at least one of the first and second curved glazings being made of mineral glass,
   said first and second curved glazings being connected together via the second and third main faces by a lamination interlayer made of a thermoformable and thermoplastic polymeric material, said lamination interlayer including a first bonding main face toward a side of the second main face and a second bonding main face toward a side of the third main face;
   a first peripheral layer forming an interior masking layer made of opaque material, which is between the second bonding face and the third main face or that is on the fourth main face, said interior masking layer being discontinuous and comprising one or more first discontinuities, the one or more first discontinuities forming a first sign, made up of one or more symbols and/or letters;
   a second peripheral layer forming an exterior masking layer made of opaque material, between the first bonding face and the second main face, facing the interior masking layer and the one or more first discontinuities; and
   a first radiation source for the first sign,
   wherein the first radiation source includes a first curved organic-light-emitting-diode (OLED) device between the second and third main faces configured to emit a first emission in the visible spectrum to illuminate the first sign.

2. The laminated vehicle windshield as claimed in claim 1, wherein the first sign is inscribed in a rectangle of centimeter-sized vertical dimension or height H and such as to define an angle $\alpha$ between the windshield and a gaze axis of the driver, the first sign being characterized by a vertical apparent height H' and H is set by the formula $H=H'/\sin(\alpha)$.

3. The laminated vehicle windshield as claimed in claim 1, further comprising a color filter between the first curved OLED device and the first sign on the fourth main face or the third main face side.

4. The laminated vehicle windshield as claimed in claim 3, wherein the color filter includes a colored filtering layer that is on the third main face side:
   on the third main face;
   or on the first curved OLED device;
   or on a curved carrier that is common to the first curved OLED device and to a second OLED device configured to illuminate a second sign, said curved carrier being transparent in front of the first curved OLED device.

5. The laminated vehicle windshield as claimed in claim 1, wherein the interior masking layer is on the third main face, and one or more first apertures in the interior masking layer are filled with a transparent layer or with a colored filtering layer.

6. The laminated vehicle windshield as claimed in claim 1, further comprising one or more second discontinuities of the interior masking layer that form a second sign, made up of one or more symbols and/or letters, which second sign is adjacent to the first sign, and wherein a second curved organic-light-emitting-diode (OLED) device is between the second and third main faces, said second curved OLED device being distinct from the first curved OLED device and being configured to illuminate the second sign, and the first and second OLED devices are on a curved common carrier.

7. The laminated vehicle windshield as claimed in claim 6, wherein the curved common carrier bears electrical conductors supplying power to the first curved OLED device and to the second curved OLED device, and the curved common carrier bearing one or more first electronic components including a first microcontroller addressing the first curved OLED device and regulating the electrical power supply of the first curved OLED.

8. The laminated vehicle windshield as claimed in claim 1, wherein the first curved OLED device is covered by a dielectric protective layer that optionally bears electrical conductors that supply the first curved OLED device with power, said protective layer optionally extending beyond one or more edges of the first curved OLED device and covering a second curved OLED device that is adjacent to the first curved OLED device and that is configured to illuminate a second sign.

9. The laminated vehicle windshield as claimed in claim 1, wherein the first curved OLED device is mounted on the second main face directly or via a carrier that is common to a second OLED device that is adjacent to the first curved OLED device and that is configured to illuminate a second sign, the first bonding main face optionally being apertured plumb with the first curved OLED device, or wherein the first curved OLED device is mounted on the third main face directly or via a carrier that is common to a second OLED device that is adjacent to the first curved OLED device and that is configured to illuminate a second sign, the second bonding main face optionally being apertured plumb with the first OLED device.

10. The laminated vehicle windshield as claimed in claim 1, wherein the first curved OLED device is encapsulated by the thermoformable material.

11. The laminated vehicle windshield as claimed in claim 1, wherein the thermoformable material includes polyvinyl butyral (PVB).

12. The laminated vehicle windshield as claimed in claim 1, wherein the first sign is chosen from:
a driver aid;
a status indicator indicating an operating state of the automobile;
information on the external environment; and
an indicator indicating connectivity to a communications network on the front passenger side lateral edge.

13. The laminated vehicle windshield as claimed in claim 1, wherein the interior masking layer and the exterior masking layer are made of the same material, and are on the second main face and the third main face or on the second main face and the fourth main face.

14. The laminated vehicle windshield as claimed in claim 1, wherein the interior masking layer is a strip of width L0 and in the zone of the first sign of width L1>L0.

15. The laminated vehicle windshield as claimed in claim 1, wherein the first curved OLED device includes a first substrate and is configured to emit through the first substrate and an optional second OLED device includes a second substrate that is adjacent or identical to the first substrate, and that is configured to emit through the second substrate.

16. The laminated vehicle windshield as claimed in claim 1, wherein the first curved OLED device includes a first curved transparent substrate including on the second main face side in this order:
a transparent lower electrode;
a first organic light-emitting system; and
a reflective upper electrode;
and wherein the windshield optionally includes a second OLED device, between the second and third main faces, which includes a second curved transparent substrate, adjacent to the first curved OLED device and configured to illuminate a second sign, and including on the second main face side in this order:
a transparent lower electrode;
a second organic light-emitting system; and
a reflective upper electrode.

17. The laminated vehicle windshield as claimed in claim 1, wherein the first curved OLED device is a bottom-emitting device.

18. The laminated vehicle windshield as claimed in claim 1, wherein the first curved glazing has a thickness E1 of at most 2.5 mm and the second curved glazing has a thickness E'1 of at most 2.2 mm.

19. The laminated vehicle windshield as claimed in claim 1, wherein the curved common carrier is of thickness E'2, with E2+E'2 smaller than E3, E2 being the thickness of the first curved OLED device, and E3 is the thickness of the lamination interlayer.

20. The laminated vehicle windshield as claimed in claim 13, wherein the interior masking layer and the exterior masking layer are made of enamel.

* * * * *